(12) United States Patent
Asada et al.

(10) Patent No.: US 10,214,173 B2
(45) Date of Patent: Feb. 26, 2019

(54) CURTAIN AIRBAG

(71) Applicants: Teruyuki Asada, Yokohama (JP);
Takayoshi Takeuchi, Yokohama (JP);
Atsushi Nakashima, Yokohama (JP);
Yosuke Shimizu, Yokohama (JP)

(72) Inventors: Teruyuki Asada, Yokohama (JP);
Takayoshi Takeuchi, Yokohama (JP);
Atsushi Nakashima, Yokohama (JP);
Yosuke Shimizu, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 14/770,508

(22) PCT Filed: Feb. 14, 2014

(86) PCT No.: PCT/JP2014/053412
§ 371 (c)(1),
(2) Date: Aug. 26, 2015

(87) PCT Pub. No.: WO2014/132810
PCT Pub. Date: Sep. 4, 2014

(65) Prior Publication Data
US 2016/0001732 A1 Jan. 7, 2016

(30) Foreign Application Priority Data

Feb. 28, 2013 (JP) .................................. 2013-038445
Mar. 1, 2013 (JP) .................................. 2013-041286

(51) Int. Cl.
B60R 21/232 (2011.01)
B60R 21/213 (2011.01)
(Continued)

(52) U.S. Cl.
CPC .......... *B60R 21/232* (2013.01); *B60R 21/213* (2013.01); *B60R 21/233* (2013.01);
(Continued)

(58) Field of Classification Search
CPC . B60R 21/233; B60R 21/0136; B60R 21/232; B60R 21/2342; B60R 21/237;
(Continued)

(56) References Cited

U.S. PATENT DOCUMENTS 6,485,089 B2 * 11/2002 Hanyu .................... B62D 21/15
29/897.2
7,261,682 B2 * 8/2007 Crookston ............ B60R 21/232
280/743.1

(Continued)

FOREIGN PATENT DOCUMENTS

CN 103269913 A 8/2013
DE 11 2009 000 321 T5 2/2011
(Continued)

OTHER PUBLICATIONS

PCT International Search Report dated Apr. 17, 2014.

*Primary Examiner* — Paul N Dickson
*Assistant Examiner* — Timothy Wilhelm
(74) *Attorney, Agent, or Firm* — Brinks Gilson & Lione

(57) ABSTRACT

A curtain airbag capable of applying tension in a vertical direction to improve occupant ejection mitigation performance. The curtain airbag is housed in an upper portion of a side surface inside a vehicle cabin and deployed along the side surface. The curtain airbag includes: a main chamber having a protection area for the occupant, and receiving an inflation gas and being inflated along a side window of a vehicle; a first chamber that overlaps an upper edge of the side window of the vehicle, the first chamber extends by being deployed toward an upper side of the main chamber (Continued)

along the upper portion of the side surface inside the vehicle cabin. The main chamber includes a second chamber positioned in a below portion of the first chamber to overlap the vehicle beltline upon deployment.

19 Claims, 14 Drawing Sheets

(51) Int. Cl.
    *B60R 21/233* (2006.01)
    *B60R 21/237* (2006.01)
    *B60R 21/00* (2006.01)
    *B60R 21/231* (2011.01)

(52) U.S. Cl.
    CPC ..... *B60R 21/237* (2013.01); *B60R 2021/0006* (2013.01); *B60R 2021/23107* (2013.01); *B60R 2021/23308* (2013.01)

(58) Field of Classification Search
    CPC .......... B60R 21/213; B60R 2021/0006; B60R 2021/23107; B60R 2021/23308
    See application file for complete search history.

(56) References Cited

U.S. PATENT DOCUMENTS

| | | | | |
|---|---|---|---|---|
| 7,278,655 B2 * | 10/2007 | Inoue | B60R 21/2342 | 280/730.2 |
| 7,500,694 B2 * | 3/2009 | Heudorfer | B60R 21/232 | 280/729 |
| 7,712,768 B2 * | 5/2010 | Fukuda | B60R 21/232 | 280/729 |
| 7,784,823 B2 * | 8/2010 | Heigl | B60R 21/232 | 280/730.2 |
| 7,823,922 B2 * | 11/2010 | Mitchell | B60R 21/232 | 280/730.2 |
| 7,931,293 B2 * | 4/2011 | Slaats | B60R 21/232 | 280/730.2 |
| 7,988,187 B2 * | 8/2011 | Yamamura | B60R 21/232 | 280/730.2 |
| 8,282,124 B2 * | 10/2012 | Trovato | B60R 21/232 | 280/730.2 |
| 8,414,014 B2 * | 4/2013 | Nogami | B60R 21/213 | 280/728.2 |
| 8,414,021 B2 * | 4/2013 | Tanaka | B60R 21/2334 | 280/730.2 |
| 8,505,967 B2 * | 8/2013 | Shamoto | B60R 21/213 | 280/729 |
| 8,550,494 B2 * | 10/2013 | Ochiai | B60R 21/232 | 280/728.2 |
| 8,608,193 B1 * | 12/2013 | Wysocki | B60R 21/233 | 280/730.2 |
| 8,622,420 B2 * | 1/2014 | Kato | B60R 21/0136 | 280/730.2 |
| 8,636,301 B1 * | 1/2014 | Wang | B60R 21/232 | 280/730.2 |
| 8,708,365 B2 * | 4/2014 | Fulmer | B60R 21/20 | 280/728.2 |
| 8,770,618 B2 * | 7/2014 | Fukawatase | B60R 21/2342 | 280/729 |
| 8,814,202 B2 * | 8/2014 | Matsushita | B60R 21/213 | 280/730.2 |
| 8,851,508 B1 * | 10/2014 | Rickenbach | B60R 21/232 | 280/729 |
| 8,894,094 B2 * | 11/2014 | Wang | B60R 21/232 | 280/730.2 |
| 8,967,660 B2 * | 3/2015 | Taguchi | B60R 21/233 | 280/729 |
| 9,016,717 B1 * | 4/2015 | Clauser | B60R 21/233 | 280/729 |
| 9,022,420 B1 * | 5/2015 | Arellano | B60R 21/232 | 280/728.2 |
| 9,108,588 B2 * | 8/2015 | Fukawatase | B60R 21/233 | |
| 9,114,777 B2 * | 8/2015 | Fukawatase | B60R 21/232 | |
| 9,156,427 B2 * | 10/2015 | Wang | B60R 21/232 | |
| 9,266,494 B2 * | 2/2016 | Wang | B60R 21/237 | |
| 2002/0180190 A1 * | 12/2002 | Tobe | B60R 21/232 | 280/730.2 |
| 2004/0000775 A1 * | 1/2004 | Henderson | B60R 21/213 | 280/730.2 |
| 2009/0212537 A1 | 8/2009 | Slaats et al. | | |
| 2011/0285117 A1 * | 11/2011 | Shamoto | B60R 21/213 | 280/730.2 |
| 2012/0248751 A1 | 10/2012 | Kato et al. | | |
| 2013/0270805 A1 * | 10/2013 | Kruse | B60R 21/232 | 280/730.2 |
| 2014/0203541 A1 * | 7/2014 | Wei | B60R 21/213 | 280/730.2 |
| 2015/0084316 A1 * | 3/2015 | Okuhara | B60R 21/2338 | 280/729 |
| 2015/0166002 A1 * | 6/2015 | Fukawatase | B60R 21/233 | 280/730.1 |
| 2015/0307057 A1 * | 10/2015 | Moon | B60R 21/232 | 280/728.2 |

FOREIGN PATENT DOCUMENTS

| | | |
|---|---|---|
| DE | 10 2010 056 342 A1 | 7/2012 |
| JP | 2009-286300 | 12/2009 |
| JP | 2011-511734 | 4/2011 |
| JP | 2012-201312 | 10/2012 |
| JP | 2014-501205 | 1/2014 |
| WO | WO 2009/102791 A1 | 8/2009 |
| WO | WO 2009/144971 A1 | 12/2009 |
| WO | WO 2010/089847 A1 | 8/2010 |
| WO | WO 2012/091656 A1 | 7/2012 |

\* cited by examiner (a)

(b)

(a)

(b)

(a)

(b)

(a)

(b)

(a)

(b)

(a)

(b)

CURTAIN AIRBAG

CROSS REFERENCE TO RELATED APPLICATIONS

This application claims priority to Japanese Patent Application Nos. 2013-038445, filed on Feb. 28, 2013; 2013-141286, filed on Mar. 1, 2013; and PCT International Patent Application No. PCT/JP2014/053412, filed on Feb. 14, 2014.

FIELD OF THE INVENTION

The present invention relates to a curtain airbag that is inflated and deployed along a side surface inside a vehicle cabin for the purpose of protecting occupants during frontal crashes, side crashes, or rollovers (lateral rollovers) of a vehicle.

DESCRIPTION OF THE RELATED ART

In recent years, high levels of safety performance have been required of vehicles. This trend is shared across countries around the world, where most vehicles are currently standard-equipped with airbags as vehicle safety devices. Companies involved in vehicle development have adopted ongoing safety improvements as a major development guideline. In line with this, new airbags are continually being developed.

Standards for evaluating vehicle safety differ from country to country, and companies approach product development such that products can meet evaluation standards in multiple countries. In the United States, for instance, which has the largest automobile fleet in the world, the Federal Motor Vehicle Safety Standards (FMVSS) in the United States are issued by the National Highway Traffic Safety Administration (NHTSA). In action of Proposed Rulemaking (NPRM) for FMVSS 226, defined by the NHTSA, a requirement is proposed that aims at "reducing the probability of occupant ejection from a vehicle through a side window using an ejection mitigation system during side crashes or rollovers (lateral rollovers)". The requirement can be met by providing a curtain airbag as an anti-ejection countermeasure that forms an ejection mitigation system.

A curtain airbag is an airbag that is provided above a door and is inflated and deployed along a side window of a vehicle in the event of an impact. An inflation region of the curtain airbag is partitioned into a plurality of small rooms (chambers).

For example, WO 2010/089847 discloses a curtain airbag that includes a front-seat inflating portion, a rear-seat inflating portion, and an upward inflating portion. In this curtain airbag, a non-inflating portion is provided in a vehicle rear side of the upward inflating portion, and a rear-end fixing point at which the non-inflating portion is fixed to a vehicle body is set.

In the curtain airbag, when the respective inflating portions are inflated in the event of an impact, a tension line is formed at a position at which the rear-end fixing point is connected to a front-end fixing point at which the front-seat inflating portion is fixed to the vehicle body. Moreover, when gas flows in the upward inflating portion, the upward inflating portion is inflated and deployed above a storage position of the rear-seat inflating portion and toward a vehicle exterior side of the roof and is inflated and deployed toward protection areas on the side surfaces of the head of an occupant.

In WO 2010/089847, the tension line formed in the event of an impact follows a so-called beltline which is the lower end of a side window and extends in a vehicle front-rear direction, for example. Thus, according to WO 2010/089847, it is possible to improve the occupant ejection mitigation performance during rollovers.

In the occupant ejection mitigation performance evaluation test defined in the above-referenced United States NPRM for FMVSS 226, an impactor is defined in (V) Proposed Ejection Mitigation Requirements and Test Procedures of the NPRM for FMVSS 226. Strike targets of the impactor are defined in Target Locations determined according to (4) Method for Determining Impactor Target Locations, (d) Locations Where the Device Would Impact the Ejection Mitigation Countermeasure To Asses Efficacy, (V) Proposed Ejection Mitigation Requirements and Test Procedures of the NPRM for FMVSS 226. These impact points are illustrated by impact point positions of the targets described in the NPRM for FMVSS 226 (for example, by the respective points indicated by A1 to A4, B1 to B4, and the like). In the present application, the point indicated by A1 is referred to as "impact point A1".

At present, a further improvement in the occupant ejection mitigation performance is required of curtain airbags. In this regard, in the technique disclosed in WO 2010/089847, tension is applied to the curtain airbag along the beltline in the event of an impact in order to improve the occupant ejection mitigation performance.

However, when gas is supplied and chambers are inflated in an emergency situation of vehicles such as during side crashes so that the weight of an occupant is applied to the chambers, the curtain airbag may not be able to endure the impact even if tension is applied along the beltline. That is, it is difficult to improve the occupant ejection mitigation performance even when tension is applied to the curtain airbag in the vehicle front-rear direction in an emergency situation of vehicles.

The present inventors have found that it is crucial to apply tension to a curtain airbag in the vehicle vertical direction in improving the occupant ejection mitigation performance.

In recent years, a crash mode called small overlap (small lap) is gathering attention as a crash mode in a crash safety performance test defined by the insurance institute for highway safety (IIHS) of the United States. In the small overlap crash mode, it is assumed that a vehicle front surface corresponding to ¼ (25%) of a vehicle width positioned at the driver's seat-side end collides with a colliding object.

In the small overlap crash mode, a vehicle itself rolls in a top view during frontal crashes (head-on crashes). Thus, a behavior in which the body (the head in particular) of an occupant sitting on the front seat moves toward the front side and the vehicle exterior side occurs. Thus, it is understood that due to such a movement of an occupant, it is difficult to achieve sufficient occupant protection with conventional airbags for head-on crashes, the curtain airbag for side crashes disclosed in WO 2010/089847, and side airbags included in seats. This is because, in the small overlap crash mode, the occupant is highly likely to slip out of the airbags.

As a result, there is a possibility that the occupant, the head in particular, collides with the side surfaces of the vehicle cabin on the front side and the vehicle exterior side. On the side to which the head of the occupant moves, various members such as a roof side rail extending in the vehicle front-rear direction between the ceiling of the vehicle and side windows, a front pillar continuous to the roof side rail, or side windows are disposed. Thus, the head of the occupant may collide with these members.

Moreover, coupling portions for connecting various frames necessary in forming the ceiling portion (roof) of a vehicle are often provided in the roof side rail of the vehicle. This coupling portion is required for enhancing the rigidity and strength of the vehicle itself in forming the ceiling portion of the vehicle and generally slightly protrudes from the vehicle body toward the vehicle interior side. That is, in the small overlap crash mode, if the head of the occupant moves toward such a coupling portion and finally makes direct contact with the coupling portion, it is not possible to protect the occupant sufficiently.

SUMMARY OF THE INVENTION

In view of such a problem, an object of the present invention is to provide a curtain airbag capable of applying tension in the vehicle vertical direction to improve the occupant ejection mitigation performance. Another object of the present invention is to provide a curtain airbag capable of protecting occupants sufficiently even when an occupant moves abnormally in such an abnormal crash mode as a small overlap.

In order to solve the problem, according to a representative aspect of the present invention, there is provided a curtain airbag that is housed in an upper portion of a side surface inside a vehicle cabin and is inflated and deployed along the side surface, including: a main chamber having a protection area to protect an occupant, the main chamber receiving an inflation and deployment gas and being inflated mainly along a side window of a vehicle; and a first chamber that overlaps an upper edge of the side window of the vehicle when inflated upon receiving the inflation and deployment gas, wherein the first chamber is configured to extend by being deployed toward an upper side of the main chamber along the upper portion of the side surface inside the vehicle cabin during deployment of the curtain airbag, and the main chamber includes a second chamber that is positioned in a below portion of the first chamber so as to overlap a beltline, which is a lower edge of the side window, when inflated upon receiving the inflation and deployment gas.

According to the configuration, when gas is supplied to the curtain airbag in an emergency situation of a vehicle such as a side crash, the first chamber is inflated to overlap an upper edge of the side window of the vehicle. Moreover, the second chamber is inflated to overlap a beltline which is a lower edge of the side window of the vehicle. Thus, even when the weight of an occupant is applied to the curtain airbag, the first and second chambers endure the weight using the upper and lower side surfaces of the side window, respectively, as a support to thereby prevent ejection of the occupant from the vehicle.

Further, in this case, since the second chamber is positioned in a below portion of the first chamber, tension is applied to the curtain airbag in a vehicle vertical direction that connects the upper and lower ends by the shortest distance. Thus, the tension line acts as a rod that is stretched between the upper and lower edges of the side window to thereby prevent the curtain airbag from flying out of the side window. As a result, the occupant ejection mitigation performance is improved further.

Here, the below portion of the first chamber means an entire lower portion of a region that includes the portions near the front and rear portions in the vehicle front-rear direction of the first chamber. However, in order to apply tension to the curtain airbag in the vehicle vertical direction most effectively, the second chamber is most preferably positioned "immediately below" within the "below portion" of the first chamber.

The first and second chambers may be set on a vertical line that passes through an impact point which is a center of an assumed collision area that overlaps the second chamber. Due to this, tension is applied to the curtain airbag in the vehicle vertical direction extending on the vertical line that passes through the impact point which is the center of the assumed collision area in an emergency situation of vehicles. Thus, the curtain airbag can improve the occupant ejection mitigation performance reliably.

The first chamber may be inflated so as to overlap a welded portion of the side surface. Here, a tab that suspends the curtain airbag from the upper portion of the side surface inside the vehicle cabin is provided in an upper portion of the curtain airbag. However, it is not possible to provide the tab in a portion that overlaps a welded portion of the side surface. In contrast, in the configuration, the first chamber is provided instead of the tab, and the inflated first chamber can overlap the welded portion. Thus, according to the curtain airbag, it is possible to apply tension in the vehicle vertical direction to a position which overlaps the welded portion and in which the tab cannot be provided and to improve the occupant ejection mitigation performance.

The first chamber may be inflated so as to overlap a bracket for attaching an assist grip. Here, the tab cannot be provided in a portion that overlaps the bracket fixed to the side surface. In the configuration, the first chamber that is inflated to overlap the bracket is provided instead of the tab. Therefore, according to the curtain airbag, it is possible to apply tension in the vehicle vertical direction to a position which overlaps the bracket and in which the tab cannot be provided and to improve the occupant ejection mitigation performance.

The first chamber may be inflated so as to overlap a fixing portion for fixing a roof trim. Here, the tab cannot be provided in a portion that overlaps the fixing portion formed in the side surface. In the configuration, the first chamber that is inflated to overlap the fixing portion is provided instead of the tab. Thus, according to the curtain airbag, it is possible to apply tension in the vehicle vertical direction to a position which overlaps the fixing portion and in which the tab cannot be provided and to improve the occupant ejection mitigation performance.

In order to solve the problem, according to another representative aspect of the present invention, there is provided a curtain airbag that is housed in an upper portion of a side surface inside a vehicle cabin and is inflated and deployed along the side surface, including: a main chamber having a protection area to protect an occupant, the main chamber receiving an inflation and deployment gas and being inflated mainly along a side window of a vehicle; and a first chamber that is inflated upon receiving the inflation and deployment gas, wherein the first chamber is provided at such a position that, when inflated upon receiving the inflation and deployment gas, the first chamber covers at least a portion of a coupling portion to which a roof side rail that is positioned between a ceiling of the vehicle and the side window above the main chamber so as to extend in a vehicle front-rear direction and a roof front rail that is positioned on a vehicle front side of the ceiling so as to extend in a vehicle width direction are connected.

Here, the coupling portion to which the roof side rail and the roof front rail are connected is positioned on a vehicle front side and a vehicle exterior side inside the vehicle cabin, for example. That is, the coupling portion is at a position which the head of an occupant is highly likely to move toward and where the head of an occupant is subjected to collision in a small overlap crash mode. The small overlap crash mode is a crash mode in a crash safety performance test defined by the IIHS of the United States. In the small overlap crash mode, it is assumed that a vehicle front surface corresponding to ¼ (25%) of a vehicle width positioned at the driver's seat-side end collides with a colliding object.

According to the configuration, the first chamber is inflated so as to cover at least a portion of the coupling portion. Thus, when the head of an occupant moves toward the coupling portion in the small overlap crash mode, the first chamber receives the head of the occupant. Thus, it is possible to prevent the head of the occupant from making direct contact with the coupling portion and to protect the occupant.

The main chamber may include a second chamber that is positioned in a below portion of the first chamber so as to overlap a beltline, which is a lower edge of the side window of the vehicle, when inflated upon receiving the inflation and deployment gas.

With this configuration, when gas is supplied to the curtain airbag in the small overlap crash mode, the first chamber is inflated to cover the coupling portion, and the second chamber is inflated below the first chamber. Thus, the head of the occupant is protected by the inflated first chamber and the body of the occupant is also protected by the second chamber. Moreover, since the second chamber is inflated in a state of overlapping the beltline, even when the weight of the occupant is applied to the curtain airbag, the first and second chambers endure the weight using the coupling portion and the beltline, respectively, as a support. Thus, it is possible to prevent ejection of the occupant from the vehicle.

Further, since the second chamber is positioned in the below portion of the first chamber, tension is applied to the curtain airbag in the vehicle vertical direction that connects the upper and lower ends by the shortest distance. Thus, the tension line acts as a rod that is stretched between the coupling portion and the beltline to thereby prevent the curtain airbag from flying toward the vehicle exterior side. As a result, the occupant ejection mitigation performance is improved further.

The curtain airbag may further include a third chamber that is positioned closer to a vehicle front side than a steering wheel of the vehicle on a front side of the second chamber when inflated upon receiving the inflation and deployment gas so as to be inflated by being bent toward a vehicle interior side by a front window of the vehicle.

With this configuration, even when the head of the occupant moves closer the vehicle front side and the vehicle exterior side than the steering wheel of the vehicle in the small overlap crash mode, the third chamber receives the head of the occupant. Thus, it is possible to protect the occupant more reliably. When the head of the occupant reaches closer to the front side than the steering wheel of the vehicle, it is expected that the occupant leans forward and the head position of the occupant is lowered. Thus, the head of the occupant can be protected by the third chamber (disposed at a lower position than the first chamber) positioned in the front portion of the second chamber below the first chamber.

The curtain airbag may further include a third chamber that is positioned closer a vehicle front side than a steering wheel of the vehicle when inflated upon receiving the inflation and deployment gas so as to extend closer to a vehicle interior side than the second chamber. With such a third chamber, when the head of the occupant reaches closer to the front side than the steering wheel of the vehicle in the small overlap crash mode, it is possible to receive the head of the occupant to protect the occupant more reliably.

The curtain airbag may further include a strap that is stretched from a front pillar of the vehicle to a rear end of the third chamber while passing through a vehicle exterior side of the third chamber and extends in a linear form when the inflation and deployment gas is supplied.

With this configuration, since the strap passes through the vehicle exterior side of the third chamber, the third chamber is moved to be pushed toward the vehicle interior side during inflation and deployment of the curtain airbag. Thus, in the small overlap crash mode, the inflated third chamber is positioned more reliably on the side to which the head of the occupant moves. Thus, the occupant can be protected reliably.

The first chamber may be folded back toward a vehicle interior side in a midway of reaching an upper end of the first chamber in a stored state of the curtain airbag. With this configuration, the portion of the first chamber folded toward the vehicle interior side is deployed toward the vehicle exterior side. Here, the upper edge of the side window is positioned on the vehicle exterior side of the first chamber. Thus, the first chamber can reliably overlap the upper edge of the side window during inflation and deployment.

The first chamber may be folded toward a vehicle interior side from a seam portion that partitions the first and second chambers and may be folded back toward a vehicle exterior side in a midway from the seam portion to an upper end of the first chamber in a stored state of the curtain airbag. In the first chamber that is folded in such a manner, since the portion folded toward the vehicle interior side is deployed toward the vehicle exterior side, the first chamber can reliably overlap the upper edge of the side window positioned on the vehicle exterior side of the first chamber.

According to the present invention, it is possible to provide a curtain airbag capable of applying tension in the vehicle vertical direction to improve the occupant ejection mitigation performance. Further, the present invention can provide a curtain airbag capable of protecting occupants sufficiently even when an occupant moves abnormally in such an abnormal crash mode as a small overlap.

DESCRIPTION OF THE PREFERRED EMBODIMENTS

Figure 1:
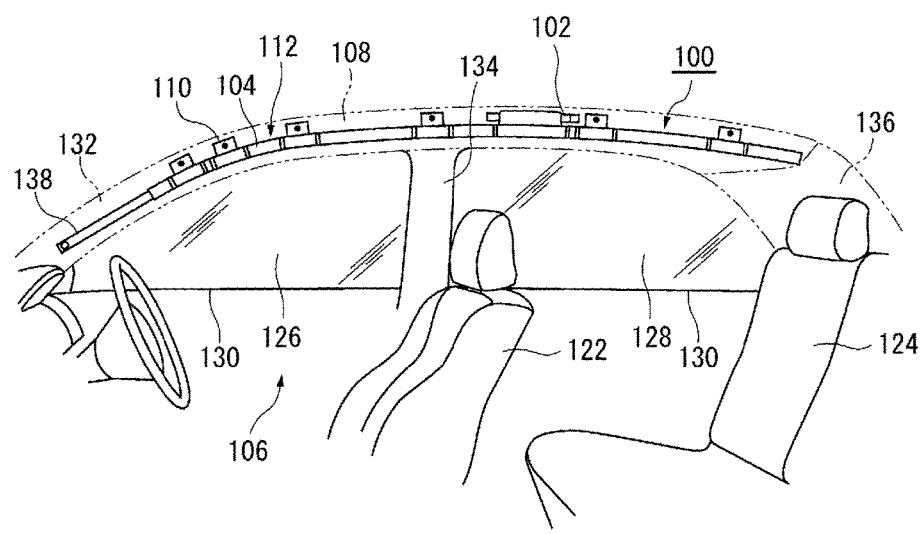
FIGS. 1A and 1B are schematic diagrams illustrating a curtain airbag according to a first embodiment of the present invention.
Figure 1:
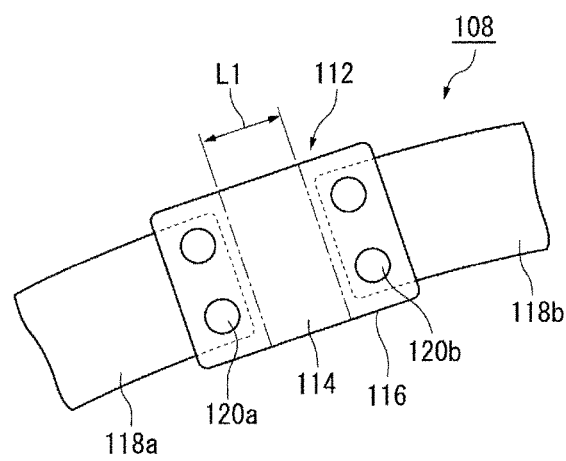

Preferred embodiments of the present invention will be explained next in detail with reference to accompanying drawings. Dimensions, materials, other specific numerical values and the like given in the embodiments are only illustrative in character, for the sake of easier understanding of the invention, and, unless particularly stated otherwise, are not meant to limit the present invention in any way. In the description and the drawings, elements having substantially the same function and configuration are denoted by identical reference numerals, and a recurrent explanation thereof will be omitted. Elements that are not directly related to the present invention are omitted in the drawings.

FIGS. 1A and 1B are schematic diagrams illustrating a curtain airbag according to a first embodiment of the present invention. FIG. 1A illustrates a curtain airbag in a non-deployed state (stored state). Although the curtain airbag illustrated in FIG. 1A is a right-side curtain airbag of a vehicle, a left-side curtain airbag (not illustrated) has a similar structure that is symmetrical to that of the left-side curtain airbag. FIG. 1B is a diagram illustrating a portion of FIG. 1A at an enlarged scale.

As illustrated in FIG. 1A, a curtain airbag 100 includes an inflator 102 which is a gas generating device and is configured such that a cushion portion 104 is inflated and deployed with the pressure of gas supplied from the inflator 102 to restrain an occupant. For example, the cushion portion 104 is formed in a bag form by sewing front and back sides of base fabrics that form the surface of the cushion portion 104 or weaving using one-piece woven (OPW).

The curtain airbag 100 needs to be deployed along the side surface of a vehicle 106 in order to cover all regions that the head and the upper half body of an occupant can collide with even when the vehicle 106 proceeds from a side crash to a rollover.

Thus, the curtain airbag 100 is attached to and stored in a roof side rail 108 indicated by a virtual line in an upper portion of a side surface inside a vehicle cabin in a rolled state as illustrated in FIG. 1A. A plurality of tabs 110 provided at a predetermined interval in an upper end of the cushion portion 104, for example, is fixed to the roof side rail 108. In this manner, the cushion portion 104 is suspended from the upper portion of the side surface in the vehicle cabin with the tabs 110 interposed.

However, the tabs 110 cannot be fixed to desired positions of the roof side rail 108. As an example, the tab 110 cannot be fixed to a welded portion 112 of the roof side rail 108 illustrated in FIG. 1A. The welded portion 112 has a base portion 116 including a planar portion 114 having the size L1 as illustrated in FIG. 1B. Panels 118a and 118b that form a part of the roof side rail 108 are welded by spot-welded portions 120a and 120b, for example, in an overlapping state on vehicle front and rear sides of the base portion 116.

In order to fix the tab 110 to the roof side rail 108, the size L1 of the planar portion 114 needs to be at least approximately 30 to 40 mm. However, the actual size L1 is approximately 10 mm, and the tab 110 cannot be fixed.

The vehicle 106 is a two-row seat vehicle in which a front seat 122 and a rear seat 124 are disposed in that order from the vehicle front side. The side windows 126 and 128 are provided in the side surface of the vehicle 106 in that order from the vehicle front side. Moreover, the lower edges 130 of the side windows 126 and 128 are referred to as so-called beltlines.

Pillars (posts) that support the roof (ceiling) are provided in the vehicle front-rear direction of the side windows 126 and 128. These pillars are referred to as a front pillar 132, a center pillar 134, and a rear pillar 136 in that order from the front side of the vehicle 106. The curtain airbag 100 includes a strap 138 which is a string-shaped member. The strap 138 has a front end attached to the front pillar 132 and a rear end attached to a non-inflation region 140 (see FIGS. 2A and 2B) of the cushion portion 104.

Figure 2:
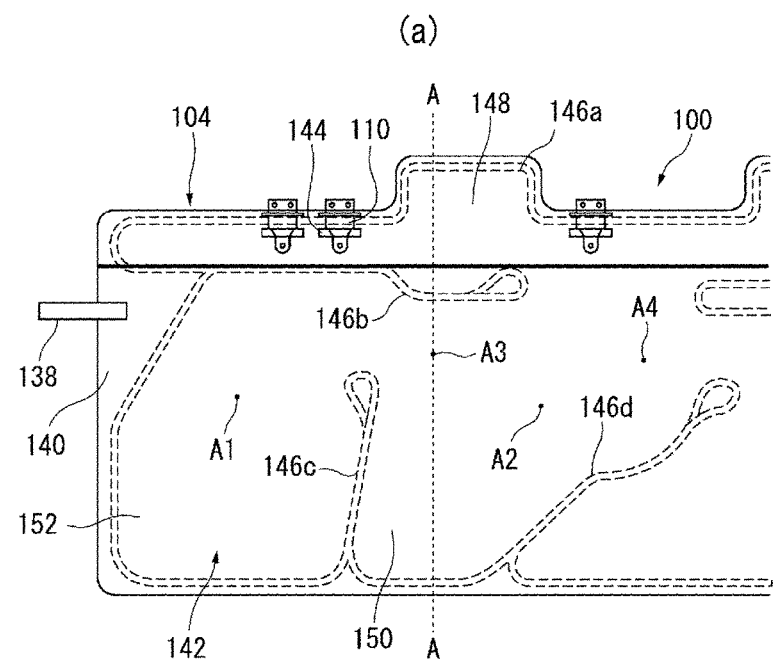
FIGS. 2A and 2B are diagrams illustrating a portion of the curtain airbag illustrated in FIGS. 1A and 1B in a deployed state at an enlarged scale.
Figure 2:
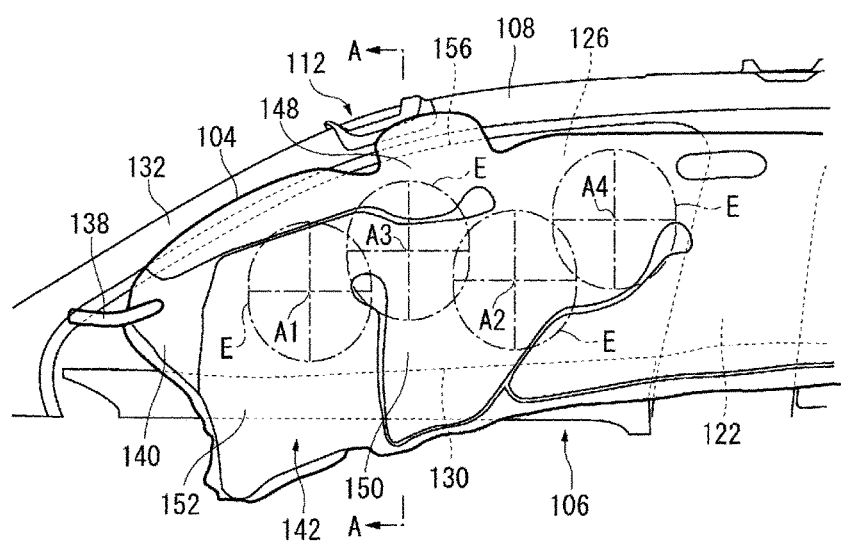

FIGS. 2A and 2B are diagrams illustrating a portion of the curtain airbag 100 illustrated in FIGS. 1A and 1B in a deployed state at an enlarged scale. FIG. 2A is a diagram illustrating the cushion portion 104 in a deployed state. FIG. 2B is a diagram illustrating a position relation between the vehicle 106 and the cushion portion 104 illustrated in FIG. 2A.

As illustrated in FIG. 2A, the cushion portion 104 of the curtain airbag 100 has an inflation region 142 that is inflated in an emergency situation and the non-inflation region 140 that is not inflated and partitions the inflation region 142. In the drawing, although a bracket 144 used when attaching the tab 110 to the roof side rail 108 is illustrated, the tab 110 may be directly fixed to the roof side rail 108 without using the bracket 144.

The inflation region 142 is partitioned further by a plurality of seam portions 146a, 146b, 146c, and 146d, for example, and includes an auxiliary chamber (first chamber 148), a second chamber 150, and a chamber 152. These chambers 148, 150, and 152 protect the head of an occupant from a collision with the side window 126 or prevent the occupant from flying out of the vehicle during rollovers. The seam portions 146a, 146b, 146c, and 146d are formed by sewing the front and rear base fabrics of the cushion portion 104, for example.

Points A1, A2, A3, and A4 in the drawing overlap an assumed collision area E surrounded by a chain line in FIG. 2B. The assumed collision area E is an area defined based on a window frame as a collision target of an impactor 154 (see FIGS. 3A and 3B) in an occupant ejection mitigation performance evaluation test based on the federal motor vehicle safety standards (FMVSS) in the United State. The impactor 154 is a test device that simulates an occupant, colliding with a test target airbag from the vehicle interior side.

In the side crash test based on FMVSS, the impactor 154 which is a test device is moved to collide with a predetermined impact point set on the curtain airbag 100 to thereby evaluate the safety of the curtain airbag 100 (occupant ejection mitigation performance evaluation test). In particular, the impact point (the center of the assumed collision area E) on the frontmost side of the side window 126 is referred to as the impact point A1. In the drawing, impact points A2, A3, and A4 are depicted as the impact points on the rear side of the impact point A1. In the present embodiment, the first chamber 148 and the second chamber 150 are set on the line A-A which is a vertical line that passes through the impact point A3 among the impact points.

As illustrated in FIG. 2B, the first chamber 148 overlaps an upper edge 156 of the side window 126 of the vehicle 106 when inflated upon receiving the inflation and deployment gas. Further, the inflated first chamber 148 also overlaps the welded portion 112 of the roof side rail 108. Here, the tab 110 cannot be set at the position at which the cushion portion 104 overlaps the welded portion 112. Thus, in the curtain airbag 100, the first chamber 148 is set instead of the tab 110 so that the inflated first chamber 148 overlaps the welded portion 112.

As illustrated in FIG. 2B, the second chamber 150 is positioned in a below portion of the first chamber 148 when inflated upon receiving the inflation and deployment gas and overlaps the beltline which is the lower edge 130 of the side window 126.

Figure 3:
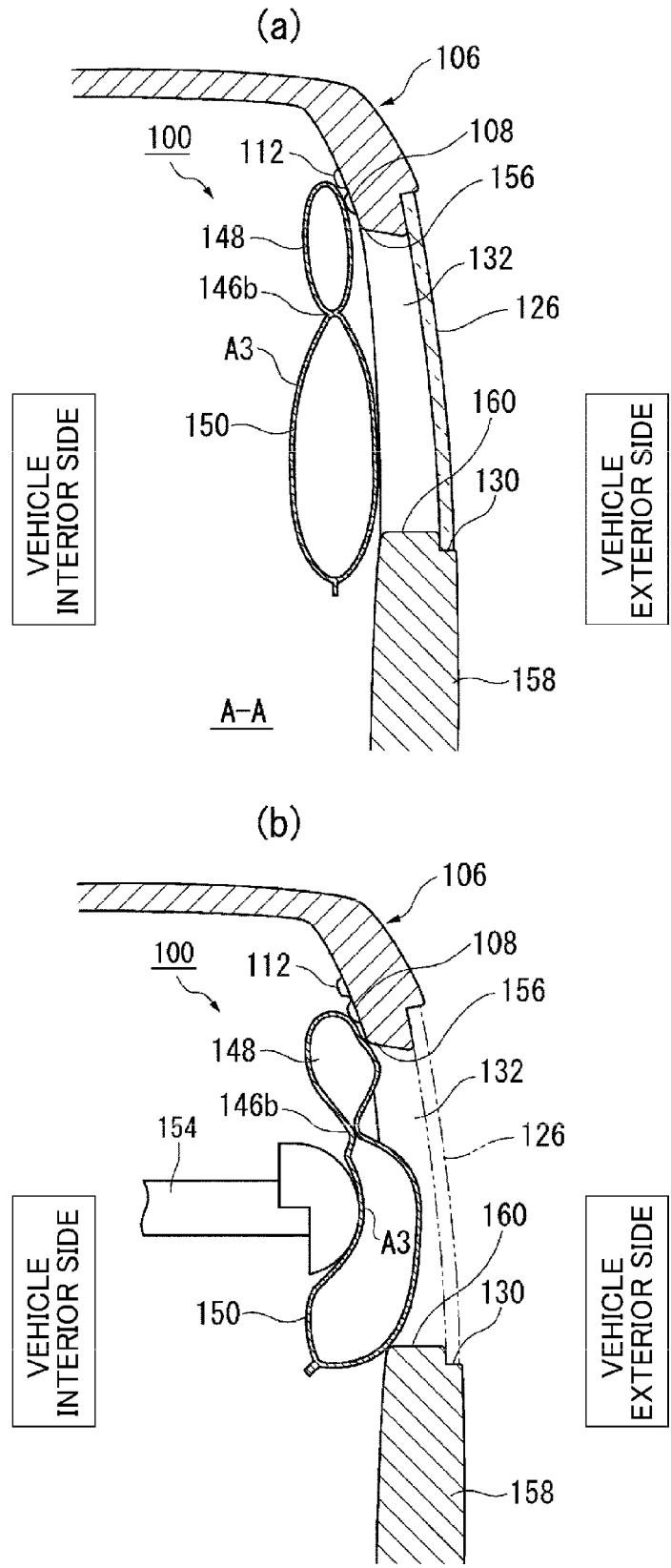
FIGS. 3A and 3B are diagrams illustrating an occupant ejection mitigation performance evaluation test of the curtain airbag illustrated in FIGS. 2A and 2B.

FIGS. 3A and 3B are diagrams illustrating the occupant ejection mitigation performance evaluation test. FIG. 3A is a cross-sectional view along line A-A in FIG. 2B. FIG. 3B is a diagram illustrating a state in which the impactor 154 collides with the curtain airbag illustrated in FIG. 3A. The occupant ejection mitigation performance evaluation test is performed in a state in which the side window 126 is open or removed, the side window 126 is depicted by a virtual line in FIG. 3B.

According to the side crash test based on the FMVSS, it is required that the moving distance of the apex on the vehicle exterior side of the impactor 154 is within 100 mm from the surface contacting the side window 126. In this example, a side crash test was performed by setting a target value such that the moving amount of the impact point A3 toward the vehicle exterior side is 80 mm or smaller.

As illustrated in FIG. 3A, in the curtain airbag 100, the inflated first chamber 148 overlaps the welded portion 112 of the roof side rail 108 as well as the upper edge 156 of the side window 126 of the vehicle 106. Moreover, the inflated second chamber 150 overlaps the beltline which is the lower edge 130 of the side window 126. The beltline is not limited to the lower edge 130 of the side window 126, and for example, an upper end 160 of a door trim 158 may be regarded as the beltline.

Subsequently, as illustrated in FIG. 3B, the impactor 154 was moved to collide with the impact point A3 to perform the side crash test. In this case, the first and second chambers 148 and 150 endure the collision using the portions (for example, the welded portion 112 of the roof side rail 108 and the upper end 160 of the door trim 158) corresponding to the upper and lower side surfaces of the side window 126 as a support.

Further, since the second chamber 150 is positioned in a below portion of the first chamber 148, tension is applied to the curtain airbag 100 in the vehicle vertical direction that connects the upper and lower ends of the curtain airbag 100 by the shortest distance. Thus, the tension line in the vehicle vertical direction acts as a rod that is stretched between the upper edge 156 and the lower edge 130 of the side window 126 to thereby prevent the curtain airbag 100 from flying out of the side window 126. Here, according to the side crash test of the curtain airbag 100, the moving amount of the impact point A3 toward the vehicle exterior side was 65.9 mm, which is smaller than the target value 80 mm, and the occupant ejection mitigation performance was improved.

Here, the below portion of the first chamber 148 means an entire lower portion of a region that includes the portions near the front and rear portions in the vehicle front-rear direction of the first chamber 148. However, in order to apply tension to the curtain airbag 100 in the vehicle vertical direction most effectively, the second chamber 150 is most preferably positioned "immediately below" within the "below portion" of the first chamber 148. Moreover, in the present embodiment, a main chamber having a protection area that is inflated along the side window 126 of the vehicle 106, for example, to protect an occupant may include the below portion of the first chamber 148 and the second chamber 150.

Figure 4:
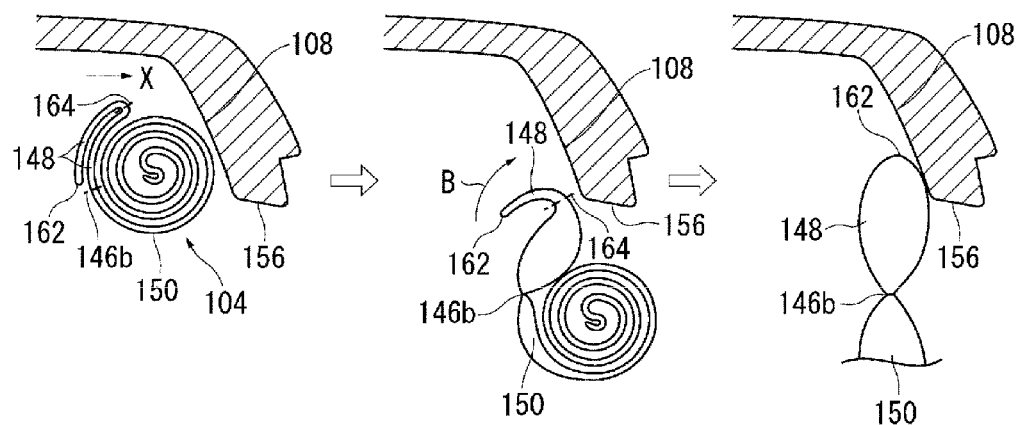
FIGS. 4A and 4B are schematic diagrams illustrating the process in which the curtain airbag illustrated in FIGS. 2A and 2B changes from a stored state to a deployed state.
Figure 4:
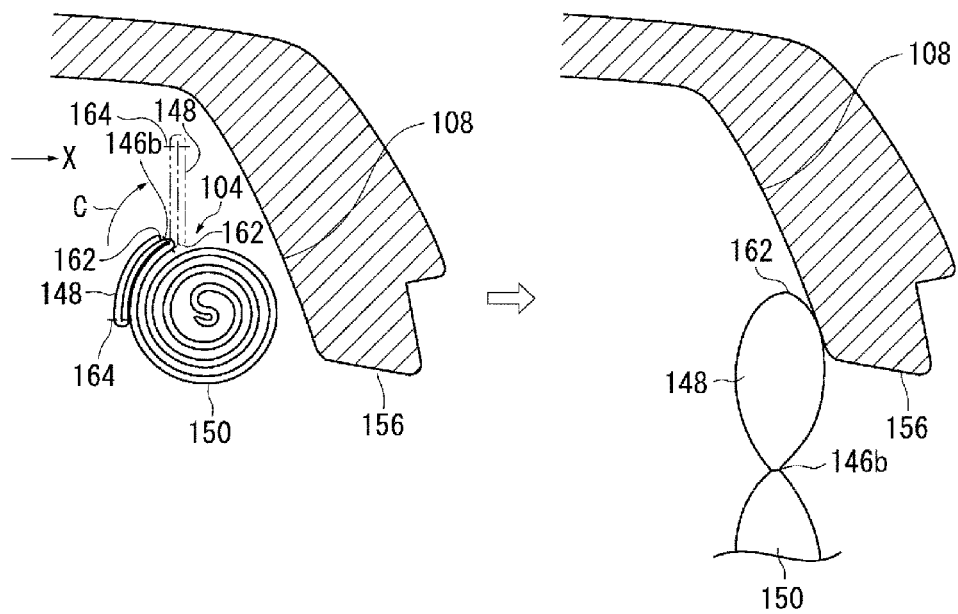

FIGS. 4A and 4B are schematic diagrams illustrating the process in which the curtain airbag 100 illustrated in FIGS. 2A and 2B proceeds from a stored state to a deployed state. Arrow X in the drawing indicates the vehicle exterior side.

The second chamber 150 is rolled in a stored state of the cushion portion 104 illustrated on the left side of FIG. 4A. The first chamber 148 is folded toward the vehicle exterior side at a position indicated by dot line 164 located in the midway from the seam portion 146b to the upper end 162 of the first chamber 148. The folded first chamber 148 overlaps the outer surface of the rolled second chamber 150.

Thus, when the first chamber 148 is inflated in an emergency situation, the portion folded toward the vehicle interior side is deployed toward the vehicle exterior side about the position indicated by dot line 164 as depicted by arrow B at the center of FIG. 4A.

That is, the first chamber 148 is inflated and deployed toward the vehicle exterior side in an emergency situation to reliably overlap the upper edge 156 of the side window 126 as depicted on the right side of FIGS. 2B and 4A, for example. In this manner, the cushion portion 104 enters a state in which the first chamber 148 is inflated and deployed and the second chamber 150 is inflated and deployed below the first chamber 148 as depicted on the right side of FIG. 4A. Due to the first and second chambers 148 and 150, tension is applied to the cushion portion 104 in the vehicle vertical direction.

The deployed state of the first chamber 148 is not limited to the folded state illustrated in FIG. 4A as long as the first chamber 148 is inflated and deployed toward the vehicle exterior side in an emergency situation to reliably overlap the upper edge 156 of the side window 126. As an example, in a stored state of the cushion portion 104 illustrated on the left side of FIG. 4B, the first chamber 148 may be folded toward the vehicle interior side at the seam portion 146b and may be further folded toward the vehicle exterior side at the position indicated by dot line 164.

When inflated in an emergency situation, the folded first chamber 148 is deployed toward the vehicle exterior side about the seam portion 146b, for example, as indicated by arrow C to enter a state indicated by a chain line in the drawing. After that, the cushion portion 104 enters a state in which the first chamber 148 is inflated and deployed and the second chamber 150 is inflated and deployed below the first chamber 148 as depicted on the right side of FIG. 4B. That is, the first chamber 148 illustrated in FIG. 4B can be inflated and deployed toward the vehicle exterior side in the emergency situation. In this manner, the first chamber 148 is configured to extend by being deployed toward the upper side of the main chamber along the upper portion of the side surface inside the vehicle cabin during deployment of the curtain airbag 100.

Figure 5:
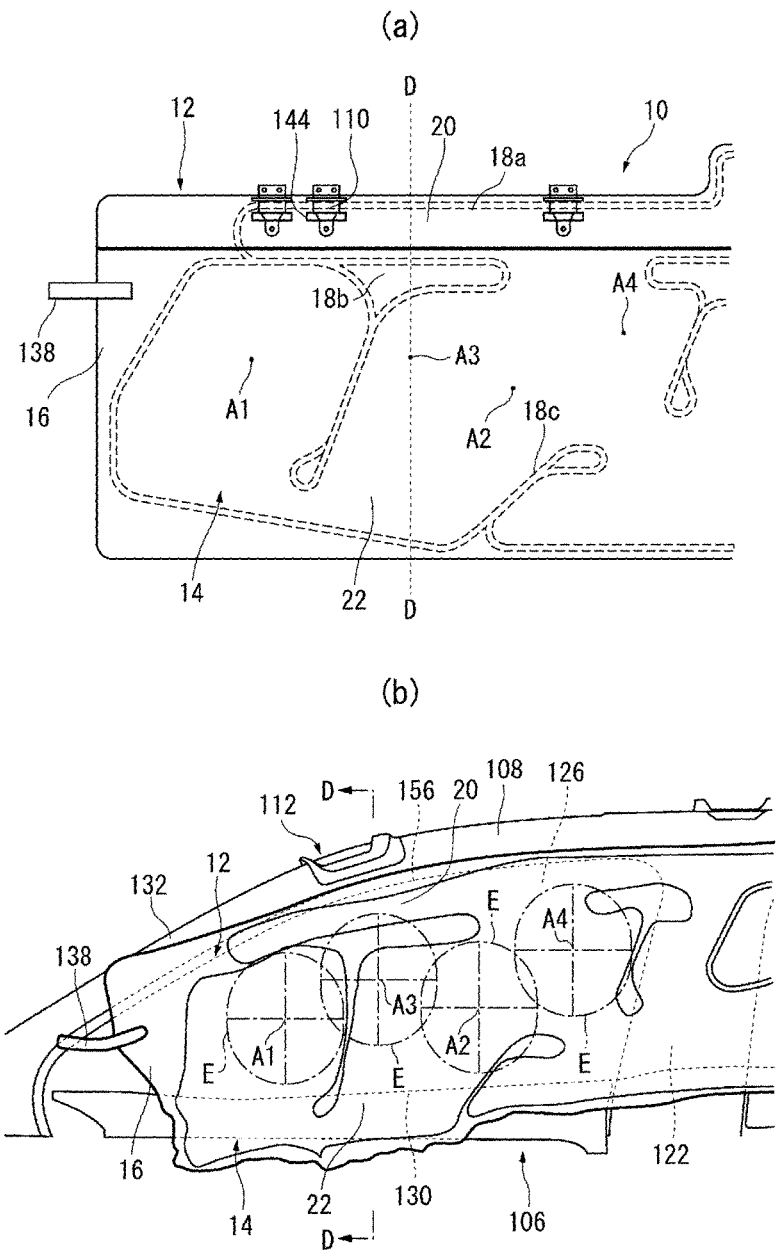
FIGS. 5A and 5B are diagrams illustrating a deployed state of a curtain airbag according to a comparative example.
Figure 6:
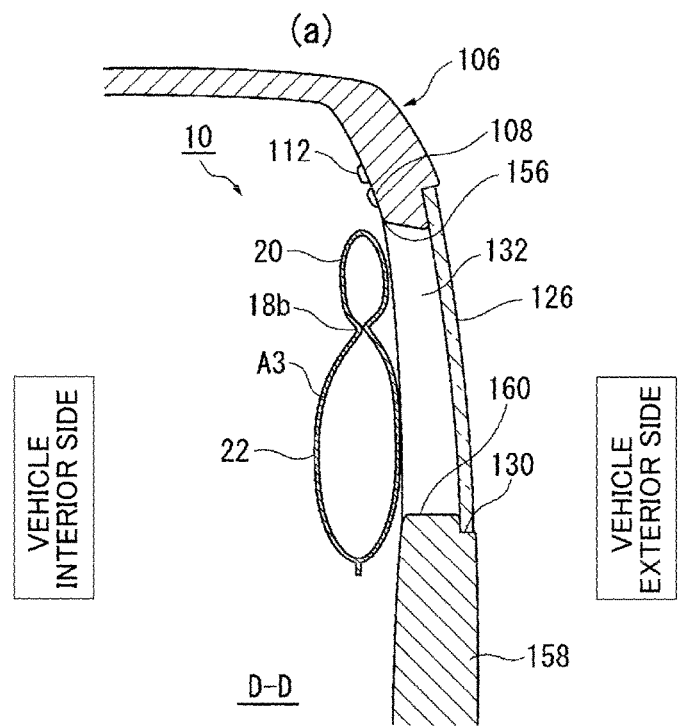
FIGS. 6A and 6B are diagrams illustrating an occupant ejection mitigation performance evaluation test of the curtain airbag illustrated in FIGS. 5A and 5B.
Figure 6:
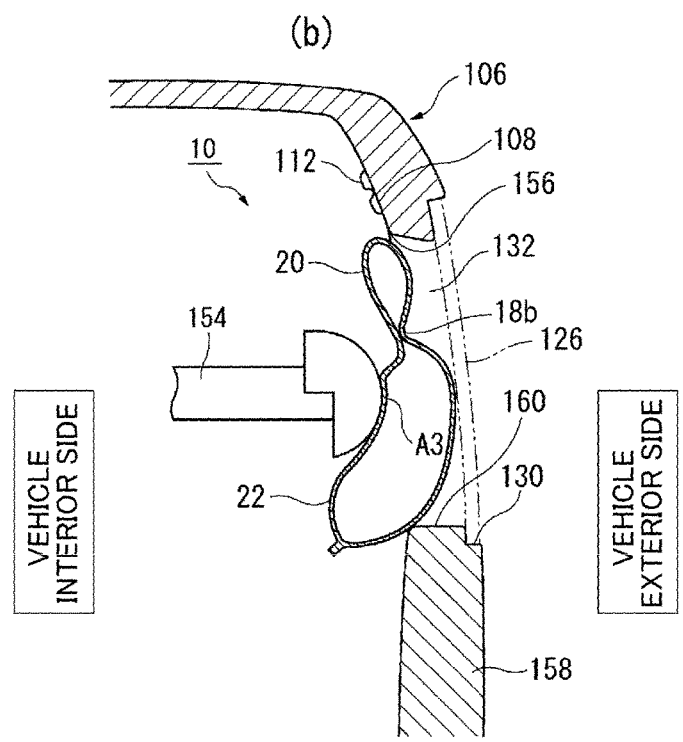

FIGS. 5A and 5B are diagrams illustrating a deployed state of a curtain airbag 10 according to a comparative example. FIG. 5A corresponds to FIG. 2A. FIG. 5B is a diagram illustrating a position relation between the vehicle 106 and a cushion portion 12 illustrated in FIG. 5A. FIGS. 6A and 6B are diagrams illustrating an occupant ejection mitigation performance evaluation test of the curtain airbag 10 illustrated in FIGS. 5A and 5B. FIG. 6A is a cross-sectional view along line D-D in FIG. 5B. FIG. 6B is a diagram illustrating a state in which the impactor 154 collides with the curtain airbag 10 illustrated in FIG. 6A. In the drawings illustrated below, the same members as those of the curtain airbag 100 according to the embodiment will be denoted by the same reference numerals, and the description thereof will not be provided appropriately.

The curtain airbag 10 according to the comparative example is different from the curtain airbag 100 in that the first chamber 148 is not provided in the cushion portion 12. As illustrated in FIG. 5A, the cushion portion 12 includes an inflation region 14 that is inflated in an emergency situation and a non-inflation region 16 that is not inflated and partitions the inflation region 14.

The inflation region 14 of the cushion portion 12 is further partitioned by a plurality of seam portions 18a, 18b, and 18c and includes chambers 20 and 22 set on a vertical line indicated by line D-D, passing through the impact point A3.

The chamber 20 does not overlap any one of the upper edge 156 of the side window 126 and the welded portion 112 of the roof side rail 108 when inflated in an emergency situation as illustrated in FIGS. 5B and 6A unlike the first chamber 148. On the other hand, when inflated, the chamber 22 overlaps the beltline which is the lower edge 130 of the side window 126.

Subsequently, the impactor 154 was moved to collide with the impact point A3 to perform a side crash test as illustrated in FIG. 6B. However, in the curtain airbag 10, even if the chamber 22 tries to endure the collision using the upper end 160 of the door trim 158 as a support, since the chamber 20 does not overlap the welded portion 112 of the roof side rail 108, tension is not applied to the curtain airbag 10 in the vehicle vertical direction. Thus, according to the comparative example, it is difficult to prevent the curtain airbag 10 from flying out of the side window 126. Here, according to the side crash test of the curtain airbag 10, the moving amount of the impact point A3 toward the vehicle exterior side was 85.7 mm, which exceeds the target value 80 mm, and the occupant ejection mitigation performance was not improved.

In contrast, according to the curtain airbag 100 of the present embodiment, in an emergency situation of the vehicle 106 such as side crashes, the inflated first and second chambers 148 and 150 overlap the upper edge 156 and the lower edge 130 of the side window 126, respectively. Thus, even when the weight of the occupant is applied to the curtain airbag 100, the first and second chambers 148 and 150 can endure the weight using the upper and lower side surfaces of the side window 126 as a support and apply tension to the curtain airbag 100 in the vehicle vertical direction. Therefore, according to the curtain airbag 100, it is possible to improve the occupant ejection mitigation performance.

Moreover, in the curtain airbag 100, since the first and second chambers 148 and 150 are set on the vertical line passing through the impact point A3, tension is applied in the vehicle vertical direction extending on the vertical line that passes through the impact point A3 in an emergency situation of the vehicle 106. Thus, the occupant ejection mitigation performance can be improved reliably.

Further, in the curtain airbag 100, the inflated first chamber 148 is set to overlap the welded portion 112 in which the tab 110 cannot be provided. Thus, in the curtain airbag 100, since the first chamber 148 overlaps a portion in which the tab 110 cannot be provided, it is possible to apply tension in the vehicle vertical direction and to improve the occupant ejection mitigation performance.

In the embodiment, although the first chamber 148 that is inflated to overlap the welded portion 112 of the roof side rail 108 is provided instead of the tab 110, the present invention is not limited to this. Another curtain airbag will be described with reference to FIGS. 7A and 7B.

Figure 7:
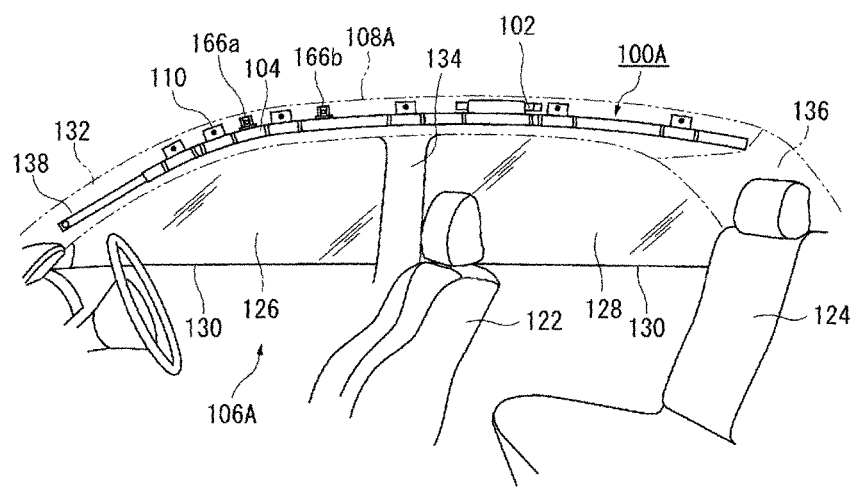
FIGS. 7A and 7B are schematic diagrams illustrating another curtain airbag.
Figure 7:
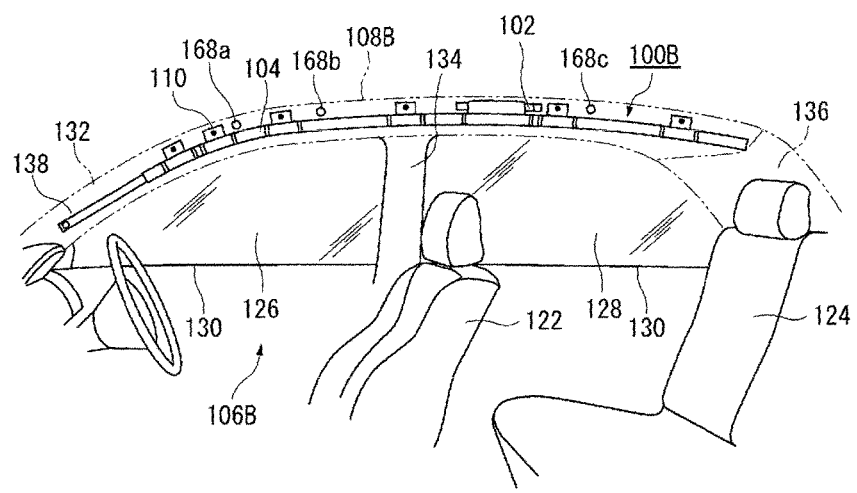

FIGS. 7A and 7B are schematic diagrams illustrating another curtain airbag. As illustrated in FIG. 7A, in a curtain airbag 100A, the cushion portion 104 is suspended from an upper portion of a side surface inside the vehicle cabin with the tab 110 fixed to a roof side rail 108A interposed. In a vehicle 106A to which the curtain airbag 100A is applied, assist grip brackets 166a and 166b for attaching assist grips (not illustrated) are fixed to the roof side rail 108A.

Thus, in the curtain airbag 100A, it is not possible to provide the tab 110 in a portion of the roof side rail 108A overlapping the assist grip brackets 166a and 166b. The assist grip bracket 166a is positioned on the virtual line that passes through the impact point A3. Thus, in the curtain airbag 100A, the first chamber 148 that is inflated so as to overlap the assist grip bracket 166a is provided instead of the tab 110.

Thus, according to the curtain airbag 100A, it is possible to apply tension in the vehicle vertical direction to a position on the vertical line passing through the impact point A3, including the position which overlaps the assist grip bracket 166a and in which the tab 110 cannot be provided, and to improve the occupant ejection mitigation performance.

As illustrated in FIG. 7B, in a curtain airbag 100B, the cushion portion 104 is suspended from an upper portion of a side surface inside the vehicle cabin with the tab 110 fixed to a roof side rail 108B interposed. In a vehicle 106B to which the curtain airbag 100B is applied, fixing portions 168a, 168b, and 168c that fix a roof trim (not illustrated) are formed in the roof side rail 108B.

Thus, in the curtain airbag 100B, it is not possible to provide the tab 110 in a portion of the roof side rail 108B overlapping the fixing portions 168a, 168b, and 168c. The fixing portion 168a is positioned on the vertical line that passes through the impact point A3. Thus, in the curtain airbag 100B, the first chamber 148 that is inflated so as to overlap the fixing portion 168a is provided instead of the tab 110.

Thus, according to the curtain airbag 100B, it is possible to apply tension in the vehicle vertical direction to a position on the vertical line passing through the impact point A3, including the position which overlaps the fixing portion 168a and in which the tab 110 cannot be provided, and to improve the occupant ejection mitigation performance.

Moreover, in the embodiment, although the first and second chambers 148 and 150 are partitioned by the seam portion 146b as illustrated in FIG. 2A, the present invention is not limited to this. Still another curtain airbag will be described with reference to FIG. 8.

Figure 8:
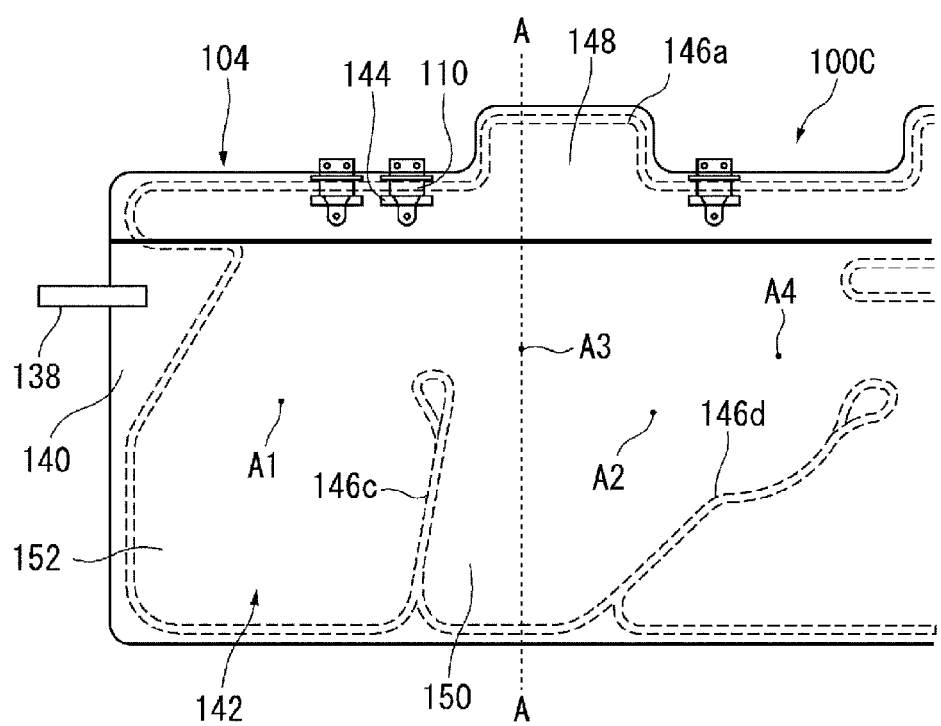
FIG. 8 is a schematic diagram illustrating still another curtain airbag.

FIG. 8 is a schematic diagram illustrating still another curtain airbag. A curtain airbag 100C is different from the curtain airbag 100 in that the seam portion 146b is not formed. In the curtain airbag 100C, the inflated first and second chambers 148 and 150 are set to the positions overlapping the upper edge 156 and the lower edge 130 of the side window 126, respectively, similarly to the curtain airbag 100. By doing so, even when the seam portion 146*b* is not formed in the curtain airbag 100C, it is possible to apply tension in the vehicle vertical direction in an emergency situation of vehicles and to improve the occupant ejection mitigation performance.

Further, in the embodiment, although the first and second chambers 148 and 150 are set on the vertical line that passes through the impact point A3, the present invention is not limited to this. As an example, the first and second chambers 148 and 150 may be set on the vertical line that passes through the impact point A1, A2, or A4 which is the other impact point as long as the first and second chambers 148 and 150 are set at the position overlapping the upper edge 156 and the lower edge 130 of the side window 126, respectively. In such a case, in the curtain airbags 100, 100A, 100B, and 100C, it is possible to apply tension in the vehicle vertical direction in an emergency situation of vehicles and to improve the occupant ejection mitigation performance.

Figure 9:
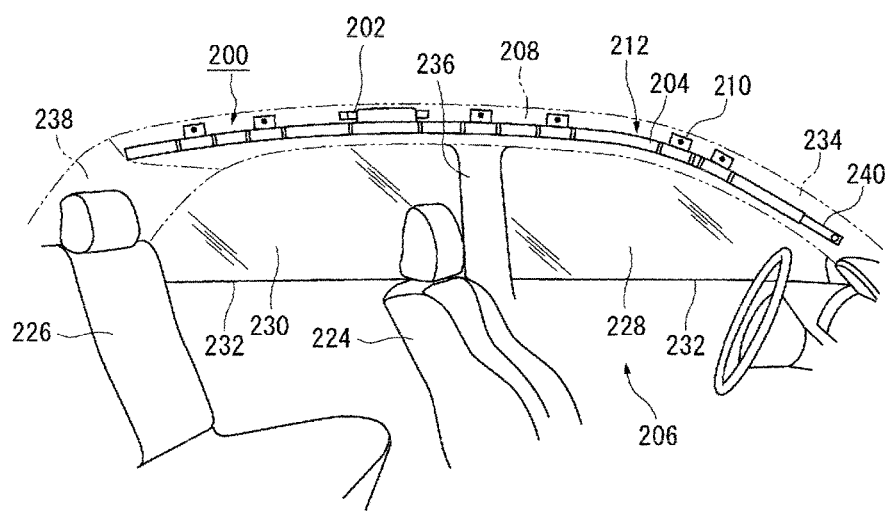
FIGS. 9A and 9B are schematic diagrams illustrating a curtain airbag according to a second embodiment of the present invention.
Figure 9:
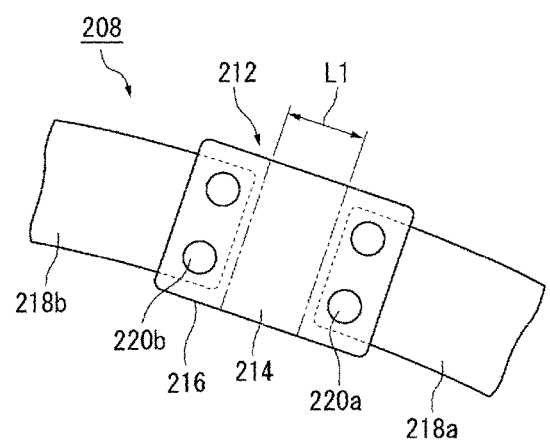

FIGS. 9A and 9B are schematic diagrams illustrating a curtain airbag according to a second embodiment of the present invention. FIG. 9A illustrates a curtain airbag in a non-deployed state (stored state). Although the curtain airbag illustrated in FIG. 9A is a left-side curtain airbag of a vehicle, a right-side curtain airbag (not illustrated) has a similar structure that is symmetrical to that of the left-side curtain airbag. FIG. 9B is a diagram illustrating a portion of FIG. 9A at an enlarged scale.

As illustrated in FIG. 9A, a curtain airbag 200 includes an inflator 202 which is a gas generating device and is configured such that a cushion portion 204 is inflated and deployed with the pressure of gas supplied from the inflator 202 to restrain an occupant. For example, the cushion portion 204 is formed in a bag form by sewing front and back sides of base fabrics that form the surface of the cushion portion 204 or weaving using one-piece woven (OPW).

The curtain airbag 200 needs to be deployed along the side surface of a vehicle 206 in order to cover all regions that the head and the upper half body of an occupant can collide with even when the vehicle 206 proceeds from a side crash to a rollover.

Thus, the curtain airbag 200 is attached to and stored in a roof side rail 208 indicated by a virtual line in an upper portion of a side surface inside a vehicle cabin in a rolled state or a folded state as illustrated in FIG. 9A. A plurality of tabs 210 provided at a predetermined interval in an upper end of the cushion portion 204, for example, is fixed to the roof side rail 208. In this manner, the cushion portion 204 is suspended from the upper portion of the side surface in the vehicle cabin with the tabs 210 interposed.

However, the tabs 210 cannot be fixed to desired positions of the roof side rail 208. As an example, the tab 210 cannot be fixed to a coupling portion 212 of the roof side rail 208 illustrated in FIG. 9A. The coupling portion 212 has a base portion 216 including a planar portion 214 having the size L1 as illustrated in FIG. 9B. Panels 218*a* and 218*b* that form a part of the roof side rail 208 are welded by spot-welded portions 220*a* and 220*b*, for example, in an overlapping state on vehicle front and rear sides of the base portion 216.

In order to fix the tab 210 to the roof side rail 208, the size L1 of the planar portion 214 needs to be at least approximately 30 to 40 mm. However, the actual size L1 is approximately 10 mm, and the tab 210 cannot be fixed.

Here, the coupling portion 212 is a portion that welds the panels 218*a* and 218*b* to form the roof side rail 208 and connects various frames (for example, a roof front rail 222 (see FIG. 11)) necessary in forming the ceiling (roof) of the vehicle 206. That is, the coupling portion 212 connects various frames by welding or the like to enhance the rigidity and strength of the vehicle 206 itself. Further, the coupling portion 212 generally protrudes toward the vehicle interior side further than the structural portions that form the vehicle body.

As illustrated in FIG. 9A, the vehicle 206 is a two-row seat vehicle in which a front seat 224 and a rear seat 226 are disposed in that order from the vehicle front side. The side windows 228 and 230 are provided in the side surface of the vehicle 206 in that order from the vehicle front side. Moreover, the lower edges 232 of the side windows 228 and 230 are referred to as so-called beltlines. The roof side rail 208 is a member that is positioned between the roof of the vehicle 206 and the side windows 228 and 230 so as to extend in the vehicle front-rear direction from the upper portion of the side surface inside the vehicle cabin.

Pillars (posts) that support the roof are provided in the vehicle front-rear direction of the side windows 228 and 230. These pillars are referred to as a front pillar 234, a center pillar 236, and a rear pillar 238 in that order from the front side of the vehicle 206. The curtain airbag 200 includes a strap 240 which is a string-shaped member. The strap 240 has a front end attached to the front pillar 234 and a rear end attached to a non-inflation region 242 (see FIG. 10) of the cushion portion 204.

Figure 10:
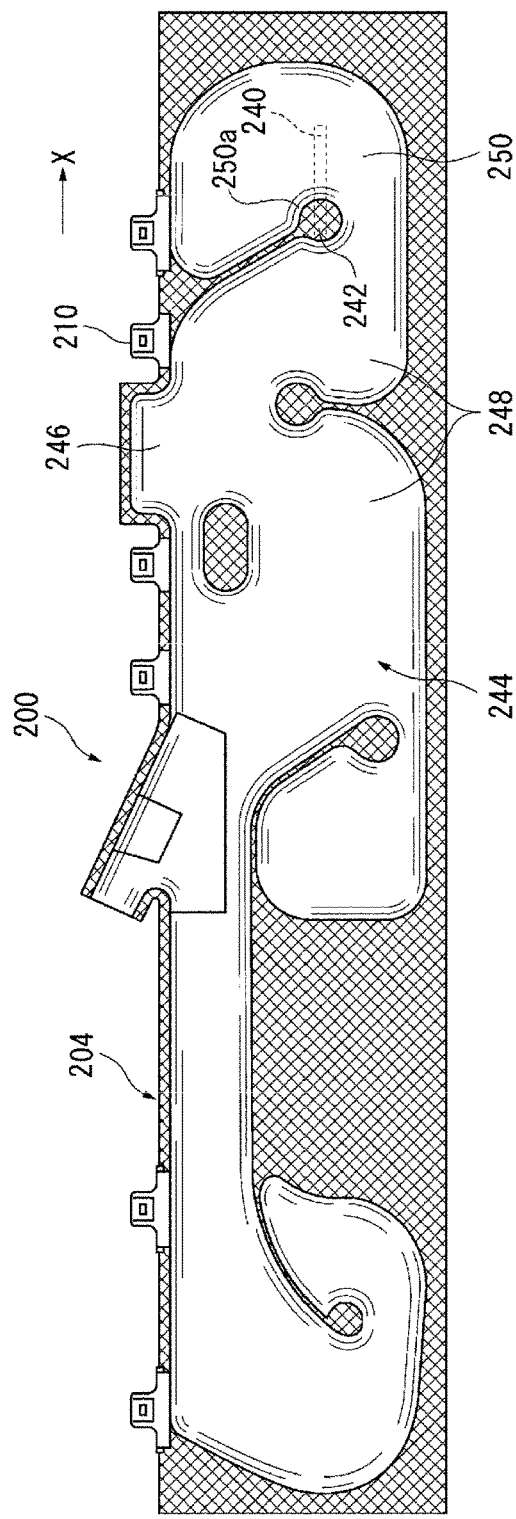
FIG. 10 is a diagram illustrating a deployed state of the curtain airbag illustrated in FIGS. 9A and 9B.

FIG. 10 is a diagram illustrating the curtain airbag 200 illustrated in FIGS. 9A and 9B in a deployed state. Arrow X in the drawing indicates the vehicle front side. The cushion portion 204 of the curtain airbag 200 has an inflation region 244 that is inflated in an emergency situation and the non-inflation region 242 indicated by hatched lines, that is not inflated and partitions the inflation region 244. The non-inflation region 242 is formed by sewing the front and rear base fabrics of the cushion portion 204, for example. The inflation region 244 is partitioned by the non-inflation region 242 and includes a first chamber 246, a second chamber 248, and a third chamber 250. The strap 240 passes toward the vehicle exterior side of the third chamber 250 as indicated by dot lines in the drawing and is attached to the non-inflation region 242 that partitions a rear end 250*a* of the third chamber 250.

Here, the chambers 246, 248, and 250 protect occupants in an emergency situation of the vehicle 206 and have different roles. First, the first and second chambers 246 and 250 will be mainly described with reference to FIGS. 11 and 12 and other drawings.

Figure 11:
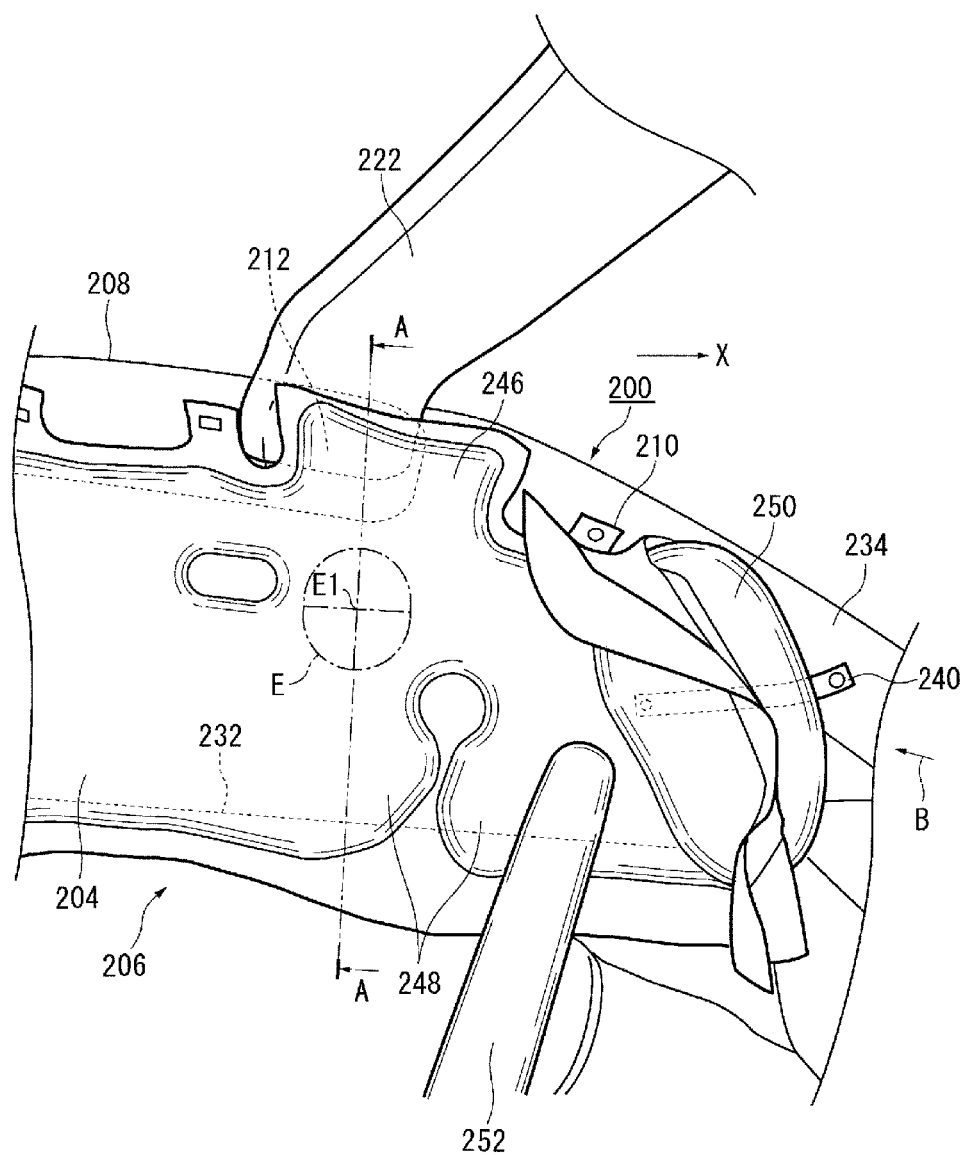
FIG. 11 is a diagram illustrating a portion of the curtain airbag illustrated in FIG. 10 and a vehicle at an enlarged scale.
Figure 12:
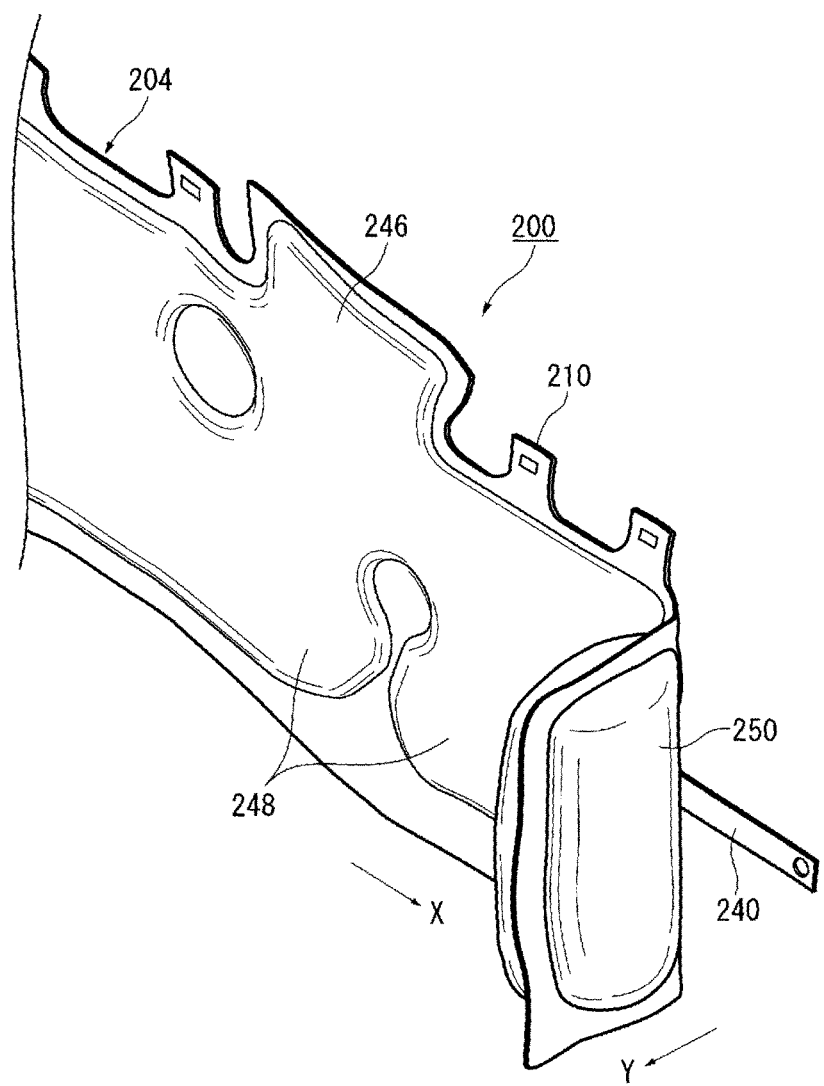
FIG. 12 is a diagram along arrow B, of the curtain airbag illustrated in FIG. 11.

FIG. 11 is a diagram illustrating a portion of the vehicle 206 and the curtain airbag 200 illustrated in FIG. 10 at an enlarged scale. FIG. 12 is a diagram along arrow B, of the curtain airbag 200 illustrated in FIG. 11. Arrow Y in FIG. 12 indicates the vehicle interior side. These drawings illustrate a state in which gas is supplied to the curtain airbag 200 and the chambers 246, 248, and 250 are inflated and deployed.

When inflated as illustrated in FIG. 11, the first chamber 246 covers at least a portion of the coupling portion 212 to which the roof side rail 208 and the roof front rail 222 are connected. The roof front rail 222 is a member that is positioned on the vehicle front side of the roof of the vehicle 206 so as to extend in the vehicle width direction and is one of the frames that form the roof.

When inflated as illustrated in FIG. 11, the third chamber 250 is positioned on the front side of the second chamber 248 and closer to the vehicle front side than a steering wheel 252 of the vehicle 206. The second chamber 248 is positioned in a below portion of the first chamber 246 as illustrated in FIG. 11. Further, the third chamber 250 is inflated by being bent toward the vehicle interior side as illustrated in FIG. 12. Alternatively, the third chamber 250 is inflated so as to extend toward the vehicle interior side further than the second chamber 248. When the third chamber 250 is inflated so as to overlap at least a portion of the second chamber 248, the third chamber 250 is inflated so as to extend toward the vehicle interior side.

As illustrated in FIG. 11, the strap 240 passes through the vehicle exterior side of the third chamber 250 from the front pillar 234 of the vehicle 206 and is stretched up to the non-inflation region 242 (see FIG. 10) that partitions the rear end 250a of the third chamber 250 as described above. The strap 240 is set so as to extend in a linear form when gas is supplied to the curtain airbag 200 as illustrated in FIGS. 11 and 12.

That is, the third chamber 250 is pushed toward the vehicle interior side by the strap 240 that extends in a linear form along the vehicle exterior side of the third chamber 250 during inflation and deployment of the curtain airbag. As a result, the third chamber 250 can be inflated by being bent toward the vehicle interior side. However, even when the strap 240 is not present, when the curtain airbag 200 is inflated and deployed, the third chamber 250 may collide with other members such as a front window (not illustrated) of the vehicle 206 and be inflated by being bent toward the vehicle interior side by the reaction. Although not illustrated in particular, even when the third chamber 250 is folded back to partially overlap the second chamber 248 so that the second chamber 248 is coupled with the non-inflation region 242 above the third chamber 250, the third chamber 250 is deployed so as to extend in the vehicle interior side. This coupling is optimally realized by sewing.

In recent years, a small overlap crash mode is gathering attention as a crash mode in a crash safety performance test defined by the insurance institute for highway safety (IIHS) of the United States. The small overlap crash mode assumes that a vehicle front surface corresponding to ¼ (25%) of a vehicle width positioned at the driver's seat-side end collides with a colliding object. In the small overlap crash mode, a vehicle itself rolls in a top view during frontal crashes (head-on crashes). It is known that, as a result, a behavior in which the body (the head in particular) of an occupant sitting on the front seat moves toward the front side and the vehicle exterior side occurs.

That is, in the small overlap crash mode, an occupant is highly likely to move toward the vehicle front side and the vehicle exterior side inside the vehicle cabin to collide with a lateral portion of the vehicle 206. In particular, the coupling portion 212 is at a position which the head of an occupant is highly likely to move toward and collide with. Moreover, since the coupling portion 212 is formed by welding, a portion that protrudes from a body panel of a vehicle body is often formed.

In contrast, the first chamber 246 is inflated so as to cover the coupling portion 212. Thus, in the curtain airbag 200, even when the head of an occupant moves toward the coupling portion 212 in the small overlap crash mode, the first chamber 246 receives the head of the occupant. Therefore, it is possible to prevent the head of the occupant from making direct contact with the coupling portion 212 and to protect the occupant.

Further, in the small overlap crash mode, when the head of the occupant moves closer to the vehicle front side and the vehicle exterior side than the steering wheel 252 of the vehicle 206, it is expected that the occupant leans forward and the head position of the occupant is lowered.

In contrast, when inflated as illustrated in FIG. 11, the third chamber 250 is positioned closer to the vehicle front side than the steering wheel 252 of the vehicle 206 and is positioned on the lower side than the front portion (that is, the first chamber 246) of the second chamber 248 positioned in a below portion of the first chamber 246. Further, the third chamber 250 is inflated by being bent toward the vehicle interior side as illustrated in FIG. 12.

Thus, in the small overlap crash mode of the curtain airbag 200, even when the head of the occupant moves closer to the vehicle front side and the vehicle exterior side than the steering wheel 252 of the vehicle 206, since the third chamber 250 receives the head of the occupant, it is possible to protect the occupant more reliably.

Next, the first and second chambers 246 and 248 will be mainly described with reference to FIG. 11. When inflated upon receiving gas, the second chamber 248 is positioned in a below portion of the first chamber and overlaps the beltline which is the lower edge 232 of the side window 228 of the vehicle 206 as indicated by chain lines in FIG. 11. Moreover, the first chamber 246 covers the coupling portion 212 as described above.

Thus, in the small overlap crash mode, when gas is supplied to the curtain airbag 200, the first chamber 246 is inflated to cover the coupling portion 212, and the second chamber 248 is inflated below the first chamber 246. Therefore, in the curtain airbag 200, the head of the occupant is protected by the inflated first chamber 246, and the body of the occupant is protected by the second chamber 248.

Here, in the present embodiment, the second chamber 248 is illustrated as an example of a main chamber having a protection area that is inflated along the side window 228 of the vehicle 206, for example, to protect the occupant. The main chamber is not limited to the second chamber 248, and the main chamber may include the inflation region 244 that is positioned on a rear side of the second chamber 248.

Further, since the second chamber 248 is inflated in a state of overlapping the beltline, even when the weight of the occupant is applied to the curtain airbag 200, the first and second chambers 246 and 248 endure the weight using the coupling portion 212 and the beltline as a support. Thus, it is possible to prevent ejection of the occupant from the vehicle.

Figure 13:
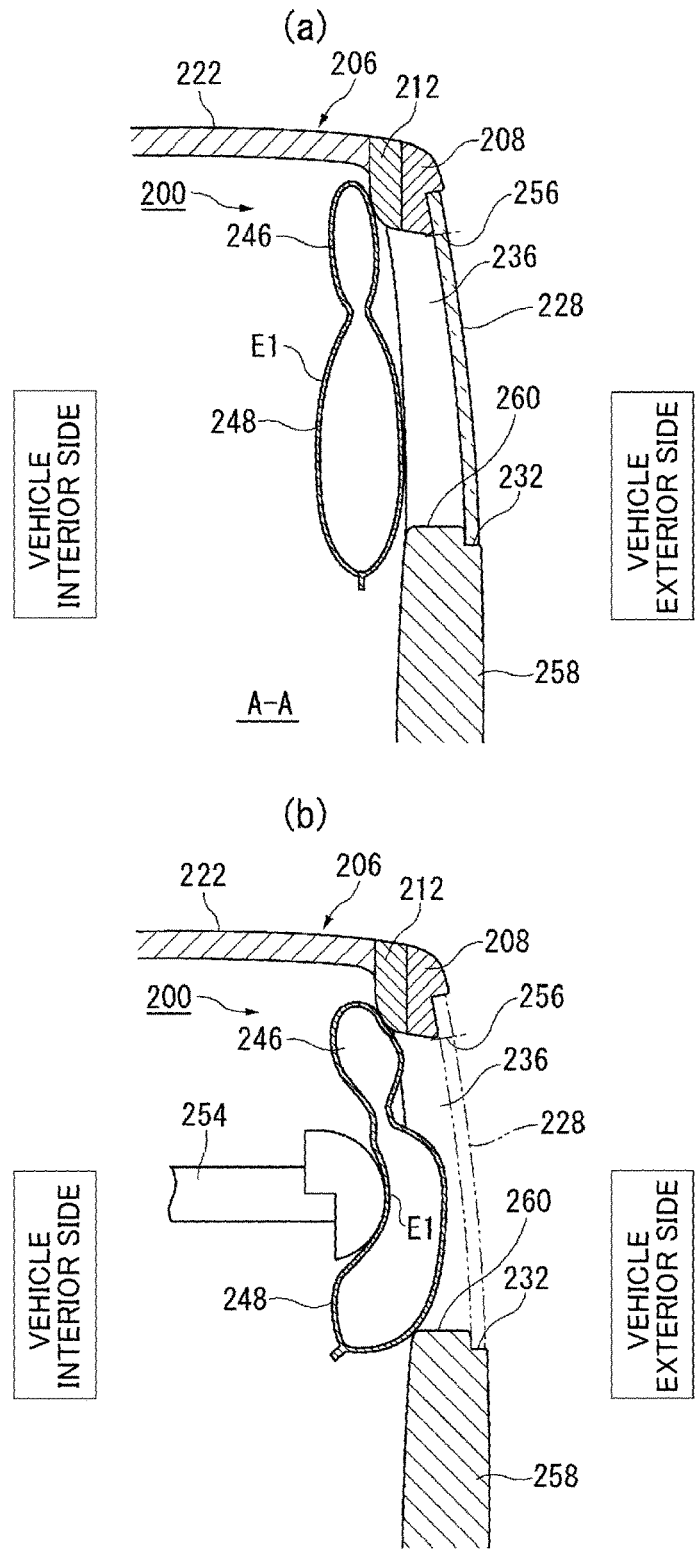
FIGS. 13A and 13B are diagrams illustrating an occupant ejection mitigation performance evaluation test of the curtain airbag illustrated in FIG. 11.

FIGS. 13A and 13B are diagrams illustrating an occupant ejection mitigation performance evaluation test of the curtain airbag 200 illustrated in FIG. 11. FIG. 13A is a diagram schematically illustrating an A-A cross-section of FIG. 11. FIG. 13B is a diagram illustrating a state in which an impactor 254 collides with the curtain airbag 200 illustrated in FIG. 13A. The impactor 254 is a test device that simulates an occupant, colliding with a test target airbag from the vehicle interior side. The occupant ejection mitigation performance evaluation test is performed in a state in which the side window 228 is open or removed, the side window 228 is depicted by a virtual line in FIG. 13B.

An impact point E1 illustrated in FIG. 11 and FIGS. 13A and 13B overlaps an assumed collision area E surrounded by a chain line in FIG. 11. The assumed collision area E is an area defined based on a window frame as a collision target of an impactor 254 in an occupant ejection mitigation performance evaluation test based on the federal motor vehicle safety standards (FMVSS) 226 in the United State.

In the side crash test based on FMVSS-226, the impactor 254 which is a test device is moved to collide with a predetermined impact point set on the curtain airbag 200 to thereby evaluate the safety of the curtain airbag 200. In particular, the impact point (the center of the assumed collision area E) on the frontmost side of the side window 228 is referred to as an impact point A1 (not illustrated). The position of the impact point based on FMVSS-226 changes depending on a window size and a vehicle shape. In the drawing, an impact point A3 on the rear side of the impact point A1 is illustrated as an example of the impact point E1. In the present embodiment, the first and second chambers 248 and 250 are set on the line A-A which is a vertical line that passes through the impact point A3.

According to the side crash test, it is required that the moving distance of the apex on the vehicle exterior side of the impactor 254 is within 100 mm from the surface contacting the side window 228. In this example, a side crash test was performed by setting a target value such that the moving amount of the impact point A3 toward the vehicle exterior side is 80 mm or smaller.

As illustrated in FIG. 13A, in the curtain airbag 200, the inflated first chamber 246 overlaps the coupling portion 212 of the vehicle 206 as well as the upper edge 256 of the side window 228. The coupling portion 212 is positioned on the vehicle interior side of the roof side rail 208 as illustrated in the drawing and protrudes slightly toward the vehicle interior side. Moreover, the inflated second chamber 248 overlaps the beltline which is the lower edge 232 of the side window 228. The beltline is not limited to the lower edge 232 of the side window 228, and for example, an upper end 260 of a door trim 258 may be regarded as the beltline.

Subsequently, as illustrated in FIG. 13B, the impactor 254 was moved to collide with the impact point A3 to perform the side crash test. In this case, the first and second chambers 246 and 248 endure the collision using the coupling portion 212 and the upper end 260 of the door trim 258, respectively, as a support.

Further, since the second chamber 248 is positioned in a below portion of the first chamber 246, tension is applied to the curtain airbag 200 in the vehicle vertical direction that connects the upper and lower ends of the curtain airbag 200 by the shortest distance. Thus, the tension line acts as a rod that is stretched between the coupling portion 212 and the beltline to thereby prevent the curtain airbag 200 from flying toward the vehicle exterior side. Here, according to the side crash test of the curtain airbag 200, the moving amount of the impact point A3 toward the vehicle exterior side was 65.9 mm, which is smaller than the target value 80 mm, and the occupant ejection mitigation performance was improved.

Here, the below portion of the first chamber 246 means an entire lower portion of a region that includes the portions near the front and rear portions in the vehicle front-rear direction of the first chamber 246. However, in order to apply tension to the curtain airbag 200 in the vehicle vertical direction most effectively, the second chamber 248 is most preferably positioned "immediately below" within the "below portion" of the first chamber 246.

Figure 14:
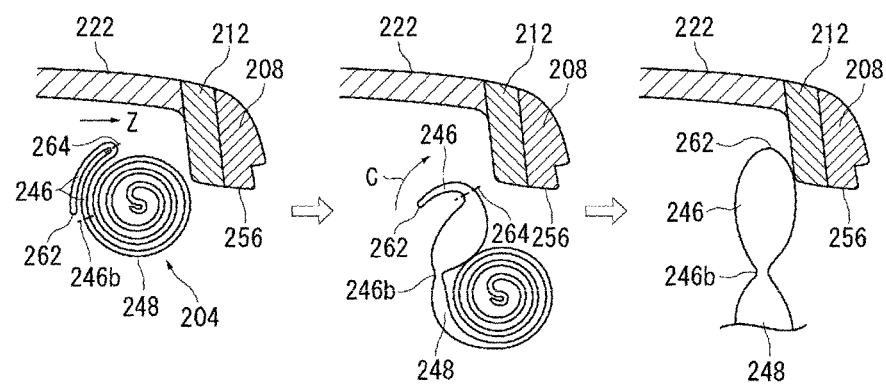
FIGS. 14A and 14B are schematic diagrams illustrating the process in which the curtain airbag illustrated in FIG. 11 changes from a stored state to a deployed state.
Figure 14:
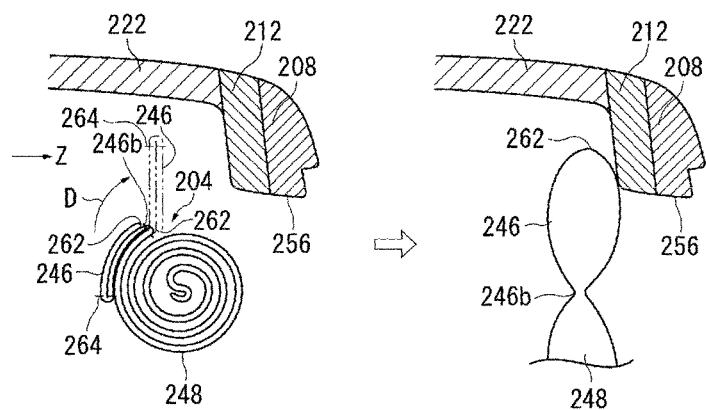

FIGS. 14A and 14B are schematic diagrams illustrating the process in which the curtain airbag 200 illustrated in FIG. 11 proceeds from a stored state to a deployed state. Arrow Z in the drawing indicates the vehicle exterior side.

The second chamber 248 is rolled in a stored state of the cushion portion 204 illustrated on the left side of FIG. 14A. The first chamber 246 is folded toward the vehicle exterior side at a position indicated by dot line 264 located in the midway from a boundary portion 246b serving as the boundary between the first and second chambers 246 and 248 to the upper end 262 of the first chamber 248. The folded first chamber 246 overlaps the outer surface of the rolled second chamber 248.

Thus, when the first chamber 246 is inflated in an emergency situation, the portion folded toward the vehicle interior side is deployed toward the vehicle exterior side about the position indicated by dot line 264 as depicted by arrow C at the center of FIG. 12A.

That is, the first chamber 246 is inflated and deployed toward the vehicle exterior side in an emergency situation to reliably overlap the coupling portion 212 as depicted on the right side of FIGS. 13A and 14A, for example. In this manner, the cushion portion 204 enters a state in which the first chamber 246 is inflated and deployed and the second chamber 248 is inflated and deployed below the first chamber 246 as depicted on the right side of FIG. 14A. Due to the first and second chambers 246 and 248, tension is applied to the cushion portion 204 in the vehicle vertical direction.

The deployed state of the first chamber 246 is not limited to the folded state illustrated in FIG. 14A as long as the first chamber 246 is inflated and deployed in an emergency situation to reliably overlap the coupling portion 212. As an example, in a stored state of the cushion portion 204 illustrated on the left side of FIG. 14B, the first chamber 246 may be folded toward the vehicle interior side at the boundary portion 246b and may be further folded toward the vehicle exterior side at the position indicated by dot line 264.

When inflated in an emergency situation, the folded first chamber 246 is deployed toward the vehicle exterior side about the boundary portion 246b, for example, as indicated by arrow D to enter a state indicated by a chain line in the drawing. After that, the cushion portion 204 enters a state in which the first chamber 246 is inflated and deployed and the second chamber 248 is inflated and deployed below the first chamber 246 as depicted on the right side of FIG. 14B. That is, the first chamber 246 illustrated in FIG. 14B can be inflated and deployed toward the coupling portion 212 in the emergency situation.

According to the curtain airbag 200 of the present embodiment, even when an occupant moves abnormally (that is, the occupant moves toward the coupling portion 212 of the vehicle 206) in an abnormal crash mode such as a small overlap, the occupant can be protected sufficiently by the inflated first and third chambers 246 and 250.

Moreover, in the curtain airbag 200, tension is applied in the vehicle vertical direction by the inflated first and second chambers 246 and 248 in an emergency situation of the vehicle 206 such as a side crash. Thus, the occupant ejection mitigation performance can be improved. In particular, the first and second chambers 246 and 248 are set on the vertical line that passes through the impact point A3, for example, tension is applied in the vehicle vertical direction extending on the vertical line that passes through the impact point A3 in an emergency situation of the vehicle 206. Thus, the occupant ejection mitigation performance can be improved reliably.

While preferred embodiments of the present invention have been described above with reference to the accompanying drawings, the present invention is not naturally limited to the embodiments. Therefore, a person skilled in the art can devise various alterations or modifications within the scope as set forth in the claims, and it is to be understood that these alterations and modifications belong, as a matter of course, to the technical scope of the present invention.

In the embodiments, examples have been described wherein the curtain airbag according to the present invention is used in an automobile, but the present invention can be used, besides automobiles, also in aircraft and ships, to elicit similar effects.

The present invention can be used in a curtain airbag that is inflated and deployed along a side surface inside a vehicle cabin for the purpose of protecting occupants during frontal crashes, side crashes, or rollovers (lateral rollovers) of a vehicle.

While the above description constitutes the preferred embodiment of the present invention, it will be appreciated that the invention is susceptible to modification, variation and change without departing from the proper scope and fair meaning of the accompanying claims.

What is claimed is:

1. A curtain airbag that is housed in an upper portion of a side surface inside a vehicle cabin and is adapted to be inflated and deployed upon deployment along the side surface for protecting an occupant, wherein the side surface includes a front pillar, a front side window, a center pillar, a rear side window, and a rear pillar in a vehicle front-rear direction, the curtain airbag comprising:
   a main chamber having a protection area to protect the occupant, the main chamber receiving an inflation and deployment gas from an inflator and being inflated and deployed mainly along a side window of a vehicle; and
   a first chamber in fluid communication with the main chamber prior to deployment and overlapping an upper edge of the side window of the vehicle when inflated and deployed upon receiving the inflation and deployment gas, wherein
   the first chamber is configured to extend by being inflated and deployed toward an upper side of the main chamber along the upper portion of the side surface inside the vehicle cabin during the deployment of the curtain airbag, wherein the first chamber extends in front of the center pillar between two tabs that are adjacent to each other and in front of the inflator in the vehicle front-rear direction and, in an inflated state, overlaps a protrusion of a welded portion protruding from the side surface toward the inside of the vehicle cabin, and
   the main chamber includes a second chamber that is positioned adjacent a below portion of the first chamber so as to overlap a vehicle beltline when inflated and deployed upon receiving the inflation and deployment gas;
   wherein the curtain airbag has a stored state, in which the first chamber is folded over toward a vehicle interior side in a location of reaching an upper end of the first chamber.

2. The curtain airbag according to claim 1, wherein the first and the second chambers are set on a vertical line that passes through an impact point which is a center of an assumed collision area that overlaps the second chamber.

3. The curtain airbag according to claim 1, wherein the first chamber is inflated and deployed so as to overlap a bracket of the vehicle for attaching an assist grip.

4. The curtain airbag according to claim 1, wherein the first chamber is inflated and deployed so as to overlap a fixing portion for fixing a roof trim.

5. The curtain airbag according to claim 1, further comprising a third chamber that is positioned closer a vehicle front side than a steering wheel of the vehicle on a front side of the second chamber when inflated upon receiving the inflation and deployment gas so as to be inflated and deployed by being bent toward a vehicle interior side by a front window of the vehicle.

6. The curtain airbag according to claim 1, further comprising a third chamber that is positioned closer a vehicle front side than a steering wheel of the vehicle when inflated upon receiving the inflation and deployment gas so as to extend closer to a vehicle interior side than the second chamber.

7. The curtain airbag according to claim 6, further comprising a strap that is stretched from a front pillar of the vehicle to a rear end of the third chamber while passing through a vehicle exterior side of the third chamber and extends in a linear form when the inflation and deployment gas is supplied.

8. A curtain airbag that is housed in an upper portion of a side surface inside a vehicle cabin in a stored state and is inflated and deployed along the side surface for protecting an occupant, comprising:
   a main chamber having a protection area to protect the occupant, the main chamber receiving an inflation and deployment gas and being inflated and deployed mainly along a side window of the vehicle; and
   a first chamber in fluid communication with the main chamber, the first chamber being inflated and deployed upon receiving the inflation and deployment gas, wherein the first chamber is provided at such a position that, when inflated upon receiving the inflation and deployment gas, the first chamber extends upward from and above the main chamber between two fastening tabs and covers at least a portion of a coupling portion bridging a gap between a front end of a roof side rail and a rear end of a roof front rail so as to overlap a protrusion of the coupling portion protruding from the side surface toward the inside of the vehicle cabin, wherein the roof side rail is positioned between a ceiling of the vehicle and the side window above the main chamber so as to extend in a vehicle front-rear direction and the roof front rail is positioned on a vehicle front side of the ceiling so as to extend in a vehicle width direction,
   wherein the first chamber is folded over toward a vehicle interior side in a location of reaching an upper end of the first chamber while in the stored state.

9. The curtain airbag according to claim 8, wherein the first chamber is folded over toward a vehicle interior side in a location of reaching an upper end of the first chamber in a stored state of the curtain airbag.

10. The curtain airbag according to claim 8, wherein the first chamber is inflated and deployed so as to overlap a welded portion of the side surface.

11. The curtain airbag according to claim 8, wherein the first chamber is inflated and deployed so as to overlap a bracket of the vehicle for attaching an assist grip.

12. The curtain airbag according to claim 8, wherein the main chamber includes a second chamber that is positioned in a below portion of the first chamber so as to overlap a vehicle beltline when inflated and deployed upon receiving the inflation and deployment gas.

13. The curtain airbag according to claim 12, further comprising:
   a third chamber that is positioned closer a vehicle front side than a steering wheel of the vehicle on a front side of the second chamber when inflated upon receiving the inflation and deployment gas so as to be inflated and deployed by being bent toward a vehicle interior side by a front window of the vehicle.

14. The curtain airbag according to claim 13, further comprising:
   a strap that is stretched from a front pillar of the vehicle to a rear end of the third chamber while passing through a vehicle exterior side of the third chamber and extends in a linear form when the inflation and deployment gas is supplied.

15. The curtain airbag according to claim 12, further comprising:

a third chamber that is positioned closer a vehicle front side than a steering wheel of the vehicle when inflated upon receiving the inflation and deployment gas so as to extend closer to a vehicle interior side than the second chamber.

16. The curtain airbag according to claim 12, wherein the first chamber is folded toward a vehicle interior side from a seam portion that partitions the first and second chambers and is folded over toward a vehicle exterior side in a location from the seam portion to an upper end of the first chamber in a stored state of the curtain airbag.

17. The curtain airbag according to claim 12, wherein the first and the second chambers are set on a vertical line that passes through an impact point which is a center of an assumed collision area that overlaps the second chamber.

18. The curtain airbag according to claim 12, wherein the first chamber is inflated and deployed so as to overlap a fixing portion for fixing a roof trim.

19. A curtain airbag that is housed in an upper portion of a side surface inside a vehicle cabin and is adapted to be inflated and deployed upon deployment along the side surface for protecting an occupant, wherein the side surface includes a front pillar, a front side window, a center pillar, a rear side window, and a rear pillar in a vehicle front-rear direction, the curtain airbag comprising:

a main chamber having a protection area to protect the occupant, the main chamber receiving an inflation and deployment gas from an inflator and being inflated and deployed mainly along a side window of a vehicle; and a first chamber that overlaps an upper edge of the side window of the vehicle when inflated and deployed upon receiving the inflation and deployment gas, wherein the first chamber is configured to extend by being inflated and deployed toward an upper side of the main chamber along the upper portion of the side surface inside the vehicle cabin during the deployment of the curtain airbag, wherein the first chamber extends in front of the center pillar between two tabs that are adjacent to each other and in front of the inflator in the vehicle front-rear direction and, in an inflated state, overlaps a protrusion of a welded portion protruding from the side surface toward the inside of the vehicle cabin, wherein the first chamber is configured to protect the head of the occupant during a frontal impact in a small-overlap crash, and wherein the main chamber includes a second chamber that is positioned adjacent a below portion of the first chamber so as to overlap a vehicle beltline when inflated and deployed upon receiving the inflation and deployment gas, wherein the curtain airbag has a stored state, in which the first chamber is folded downward toward a vehicle interior side from a seam portion, which partitions the first chamber from the second chamber, and is folded over upward toward a vehicle exterior side along a line midway from the seam portion to an upper end of the first chamber.

\* \* \* \* \*